Aug. 6, 1935.  J. R. PEIRCE  2,010,642
ACCOUNTING MACHINE
Filed Jan. 7, 1930    21 Sheets-Sheet 3

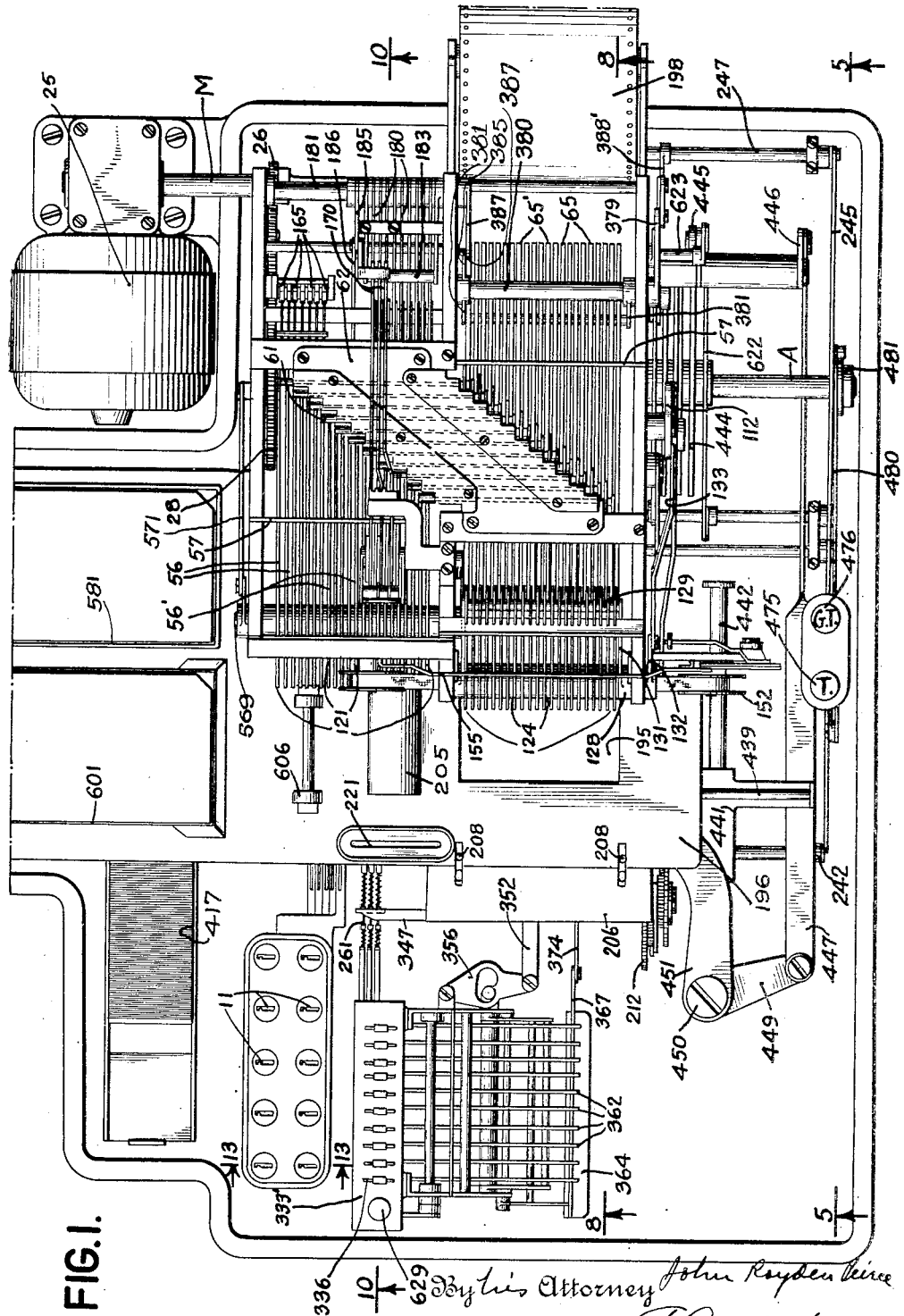

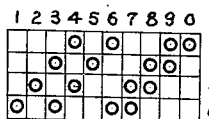

Inventor
John Royden Peirce
By his Attorney
A. C. Maby

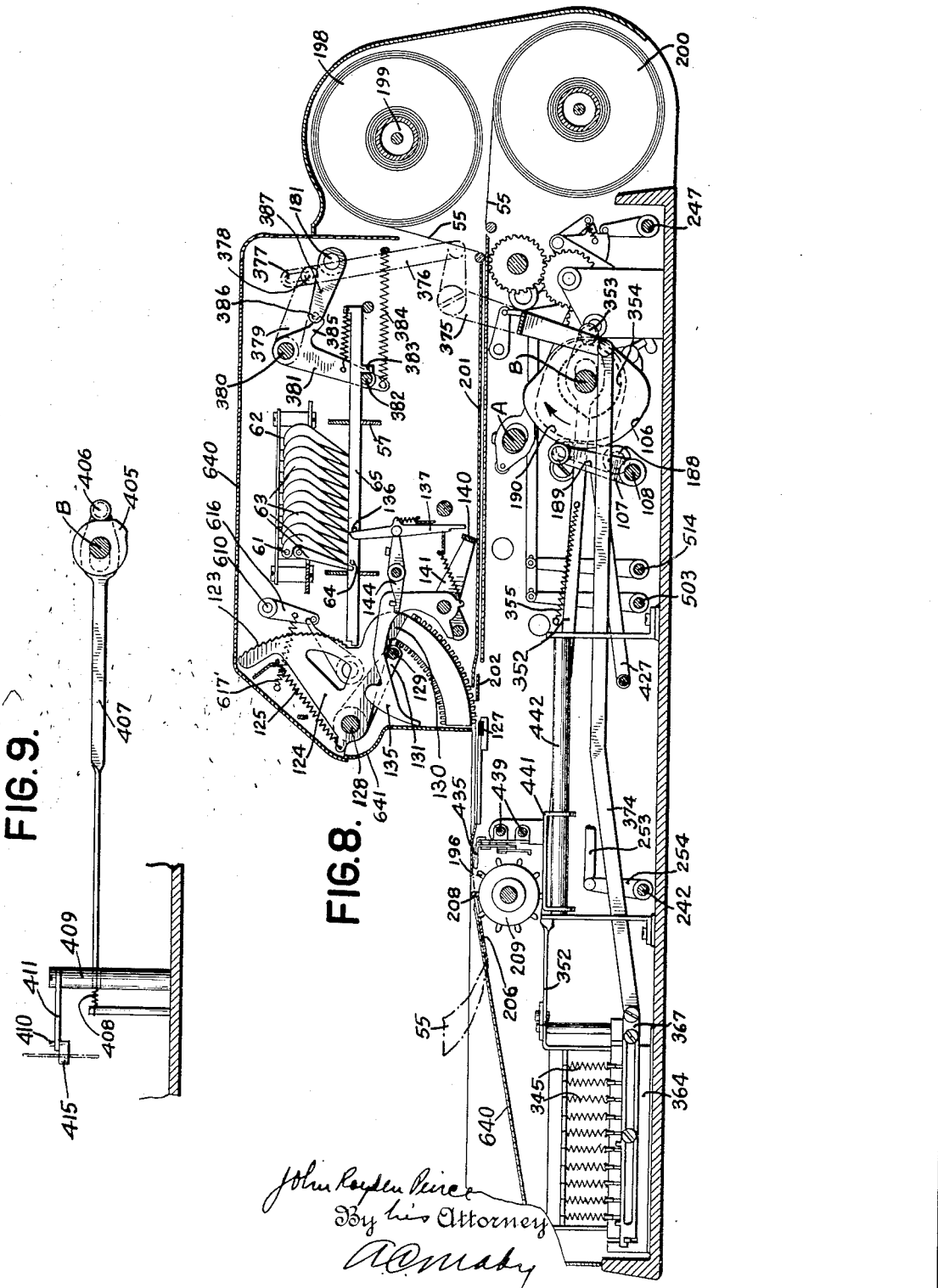

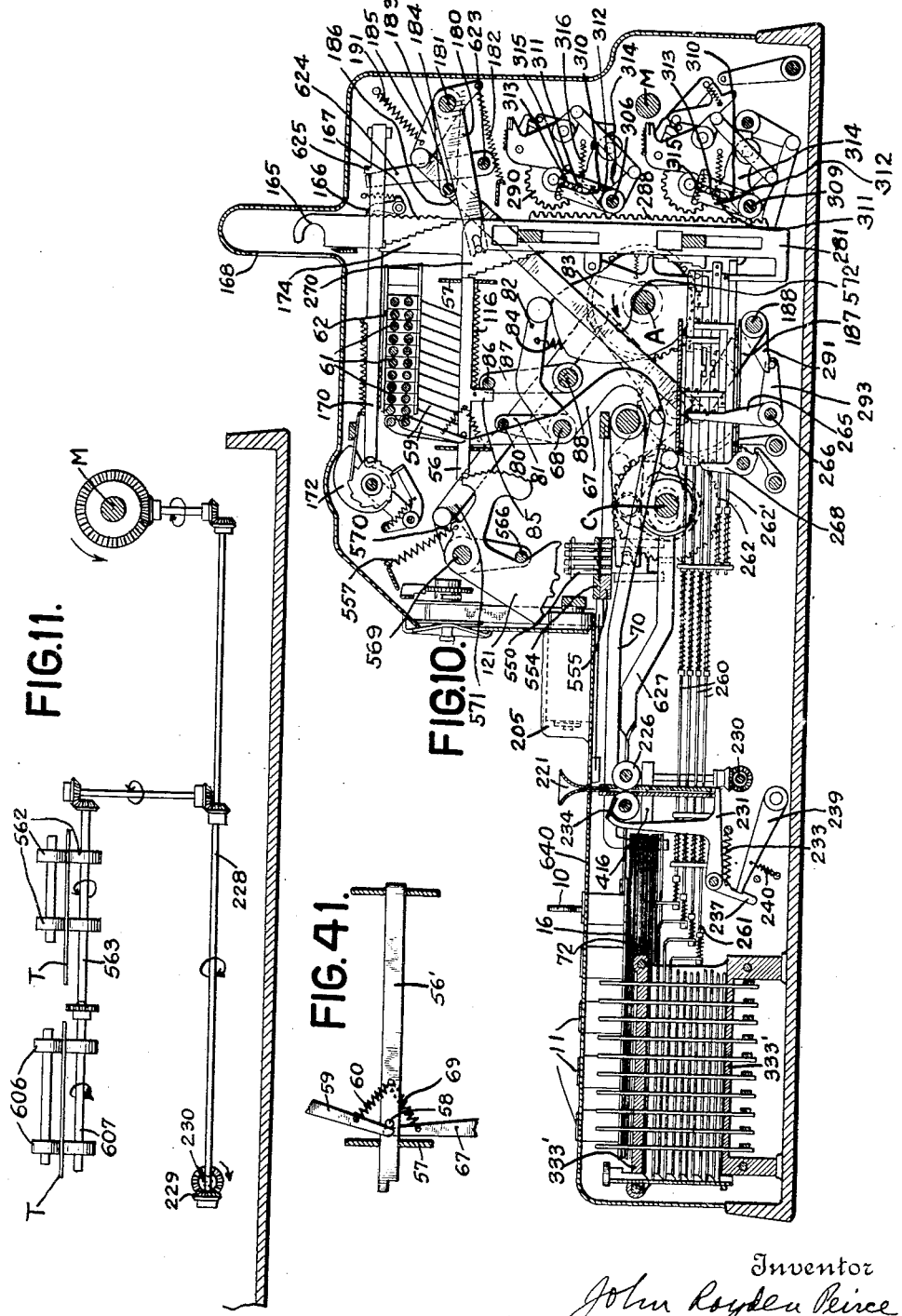

Aug. 6, 1935.   J. R. PEIRCE   2,010,642
ACCOUNTING MACHINE
Filed Jan. 7, 1930   21 Sheets-Sheet 7
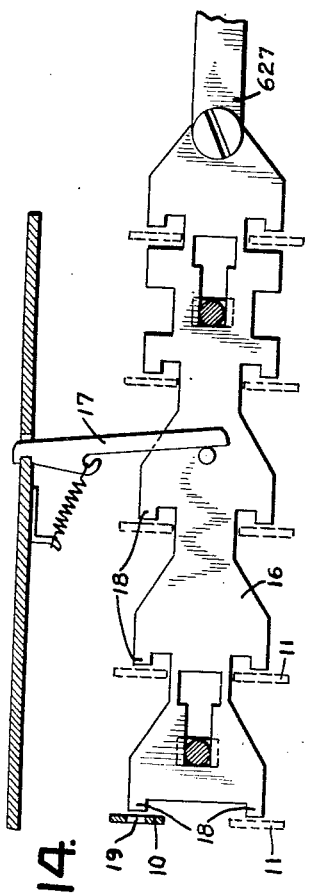
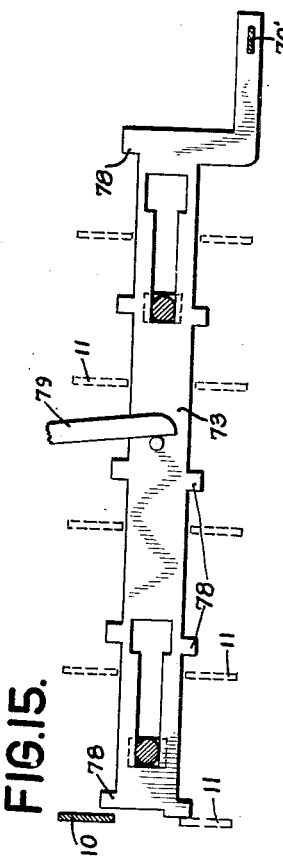
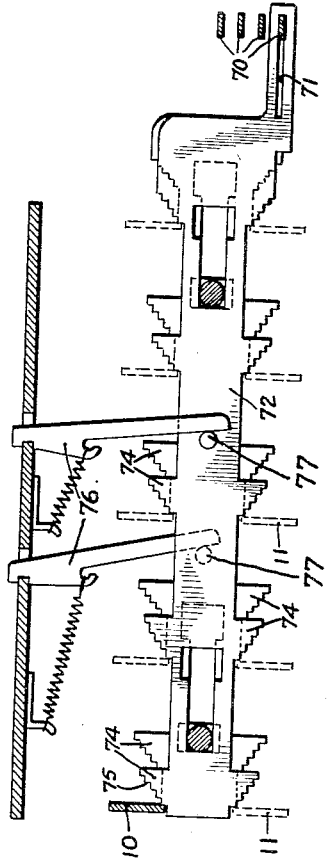
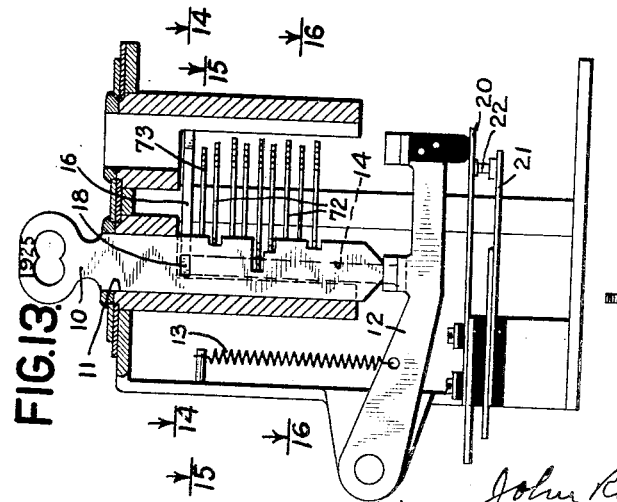
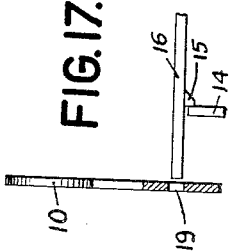

Aug. 6, 1935.  J. R. PEIRCE  2,010,642
ACCOUNTING MACHINE
Filed Jan. 7, 1930  21 Sheets-Sheet 8
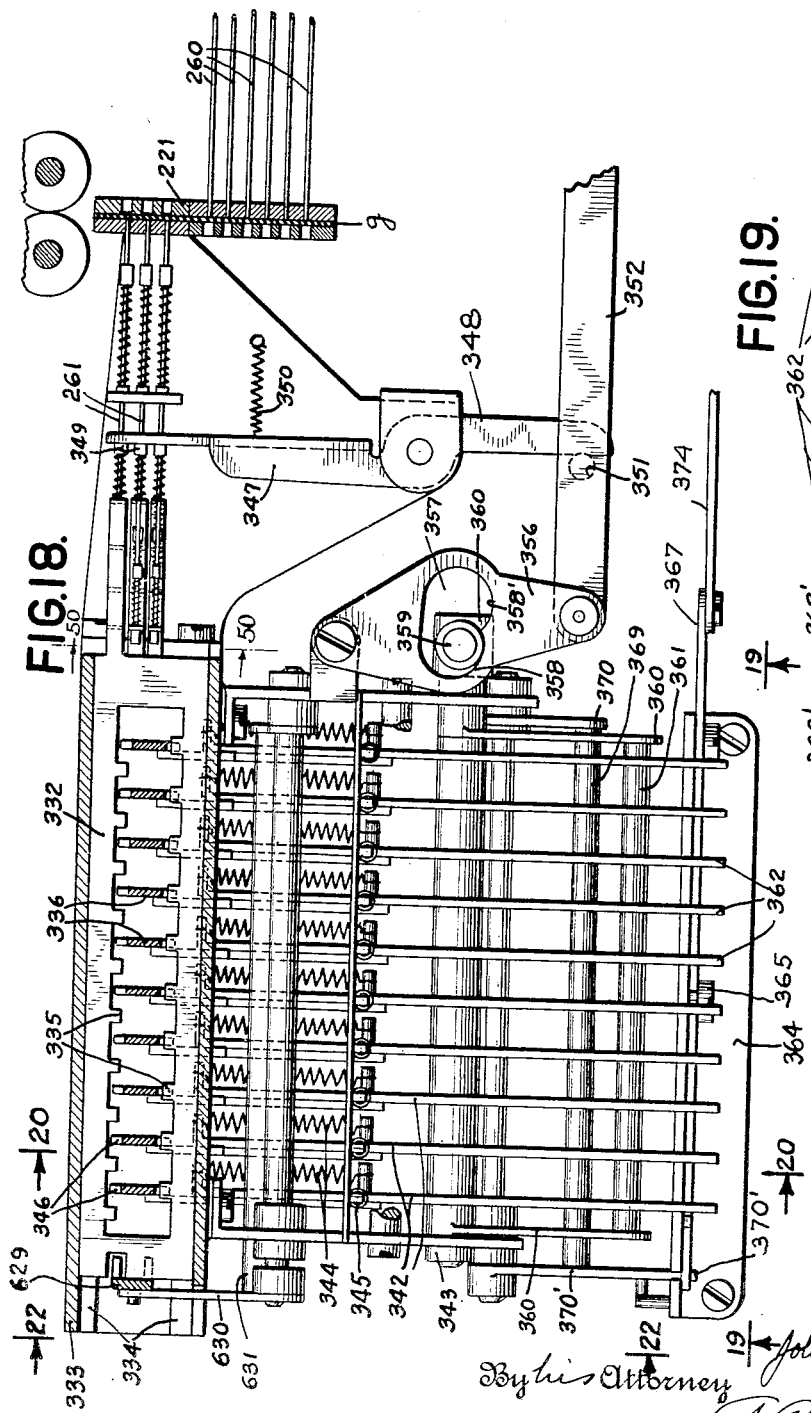
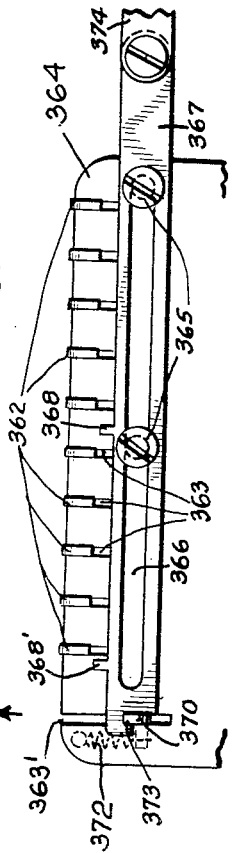

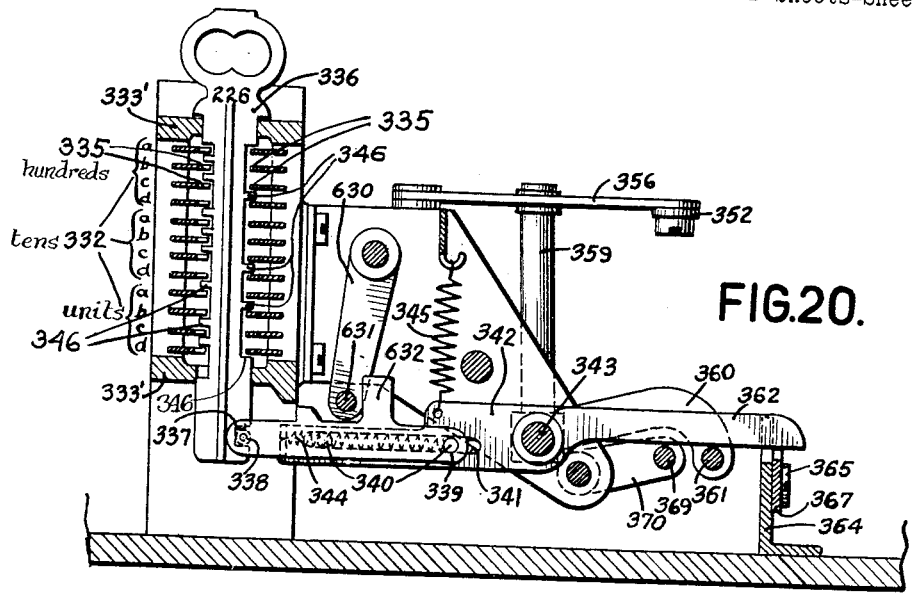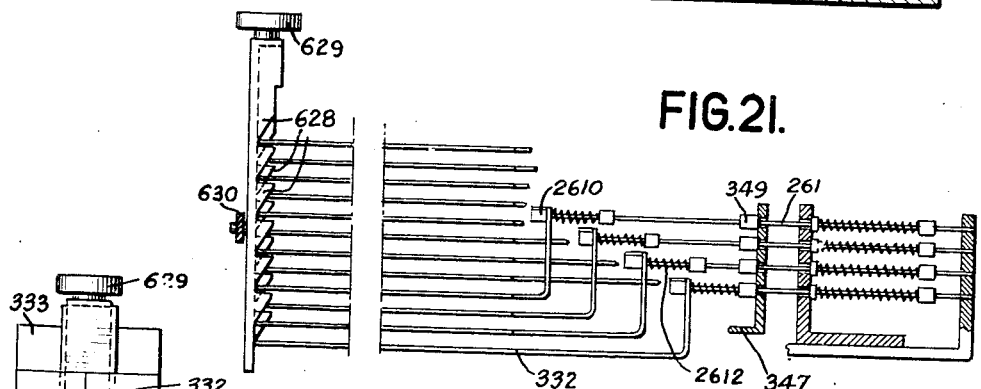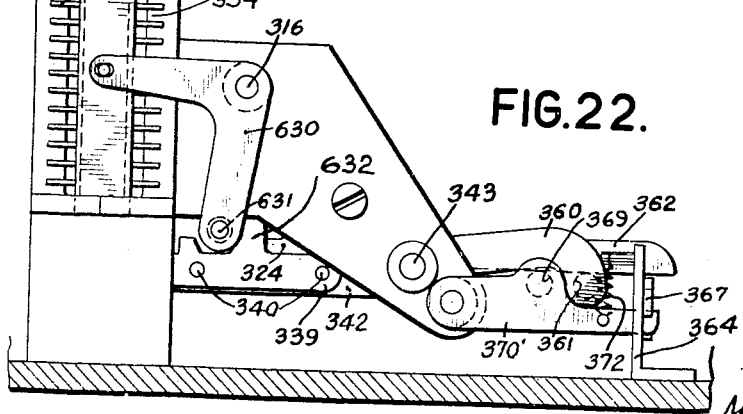

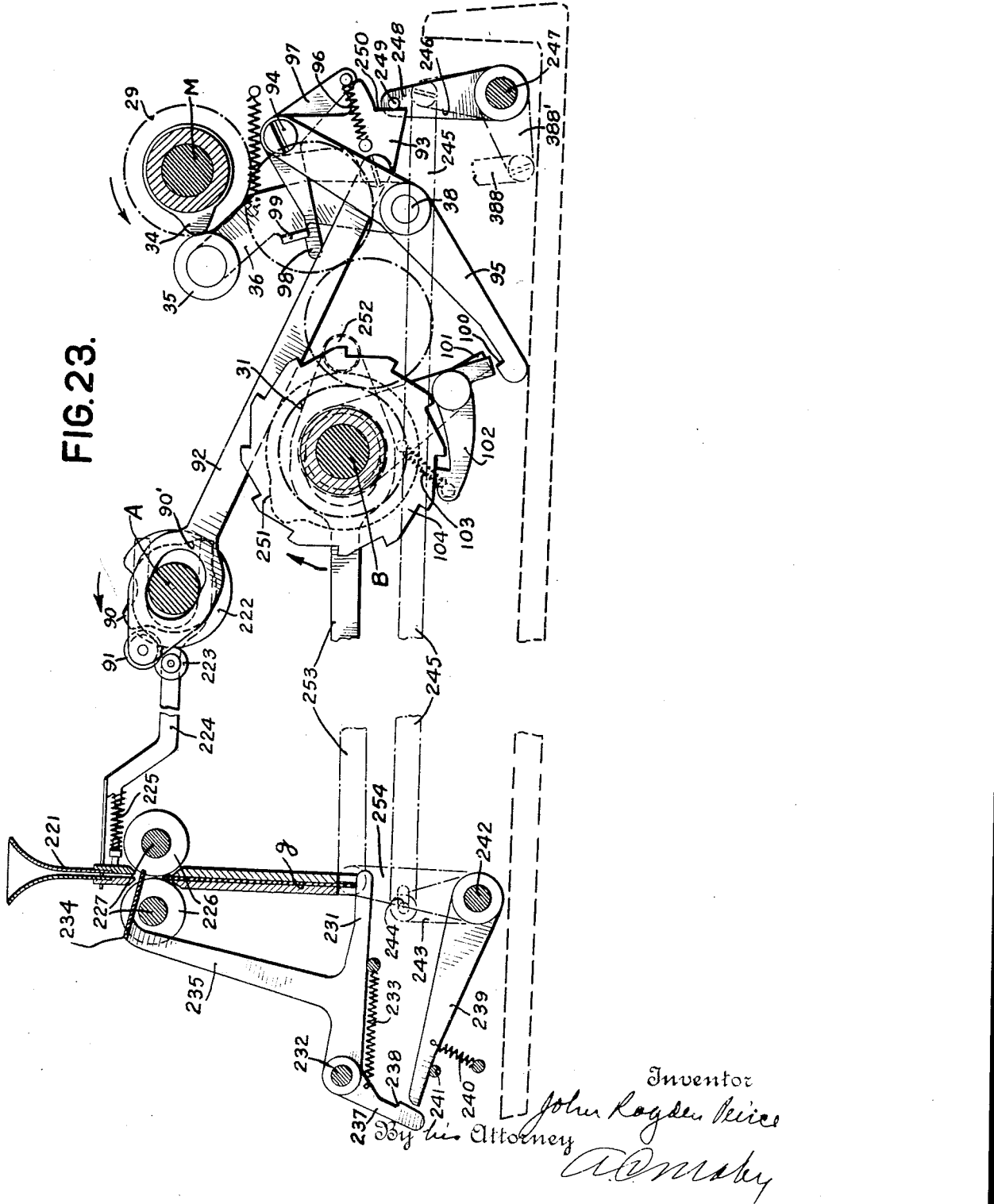

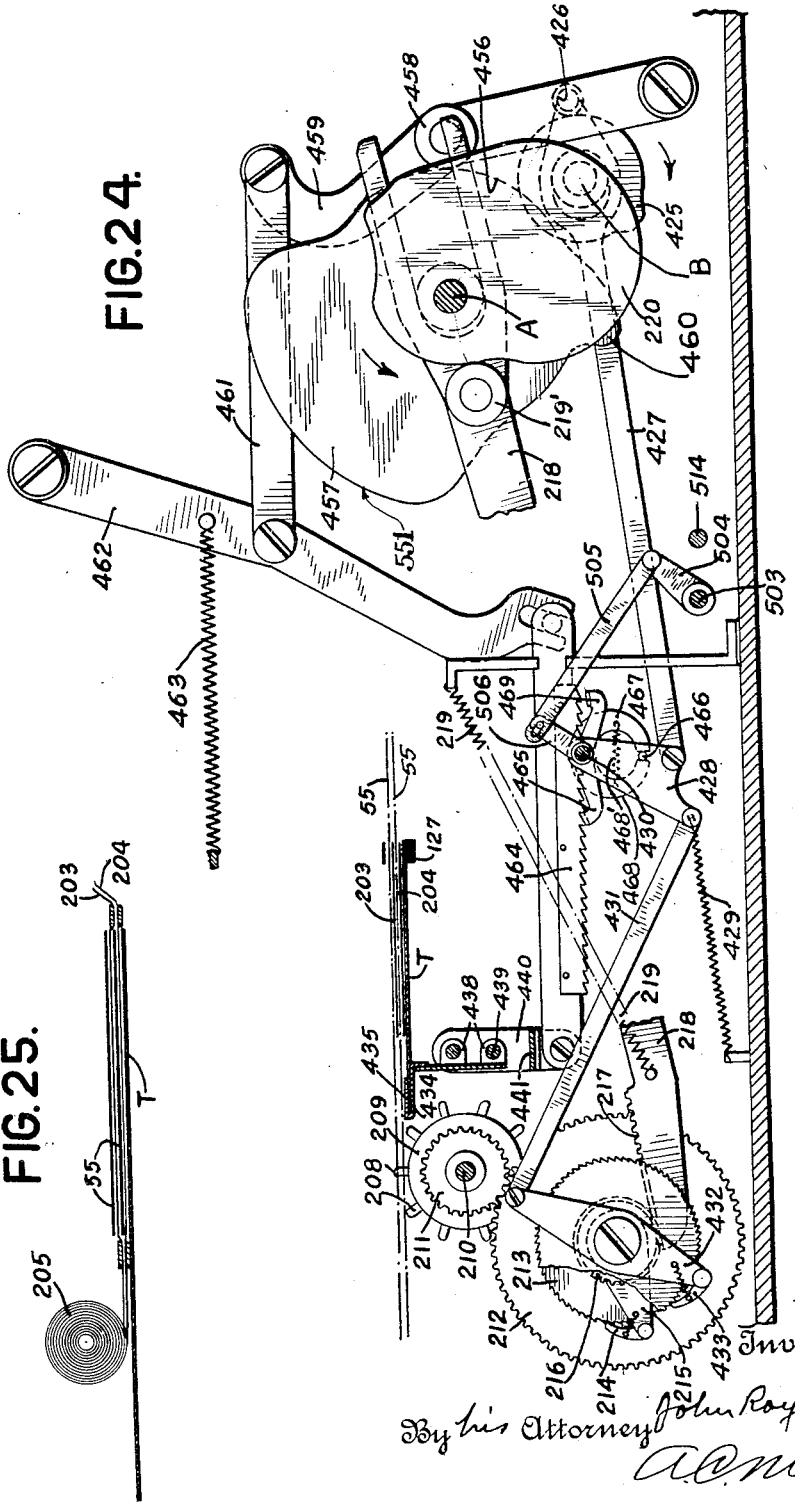

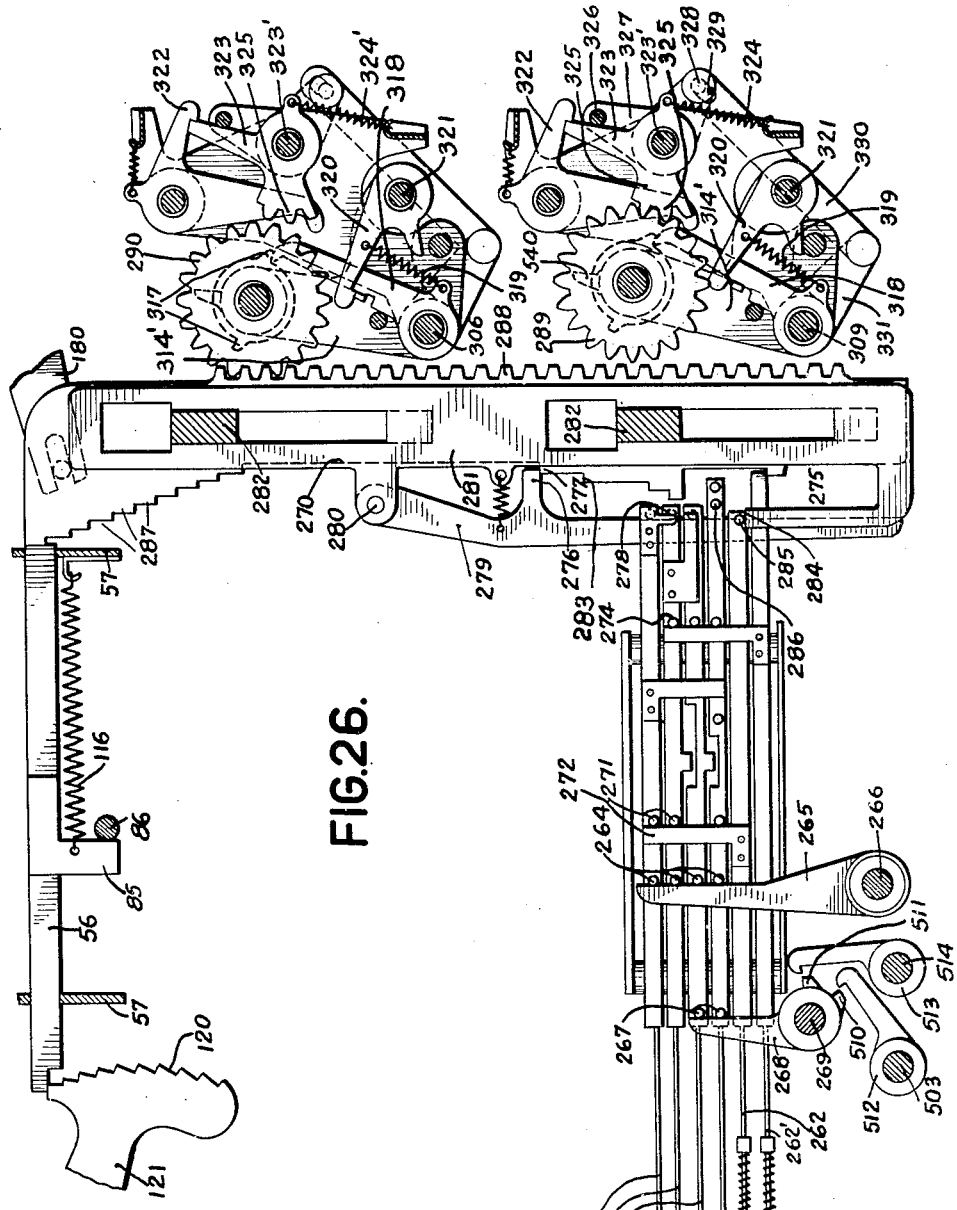

Aug. 6, 1935.  J. R. PEIRCE  2,010,642
ACCOUNTING MACHINE
Filed Jan. 7, 1930   21 Sheets-Sheet 13

Inventor
John Royden Peirce
Attorney

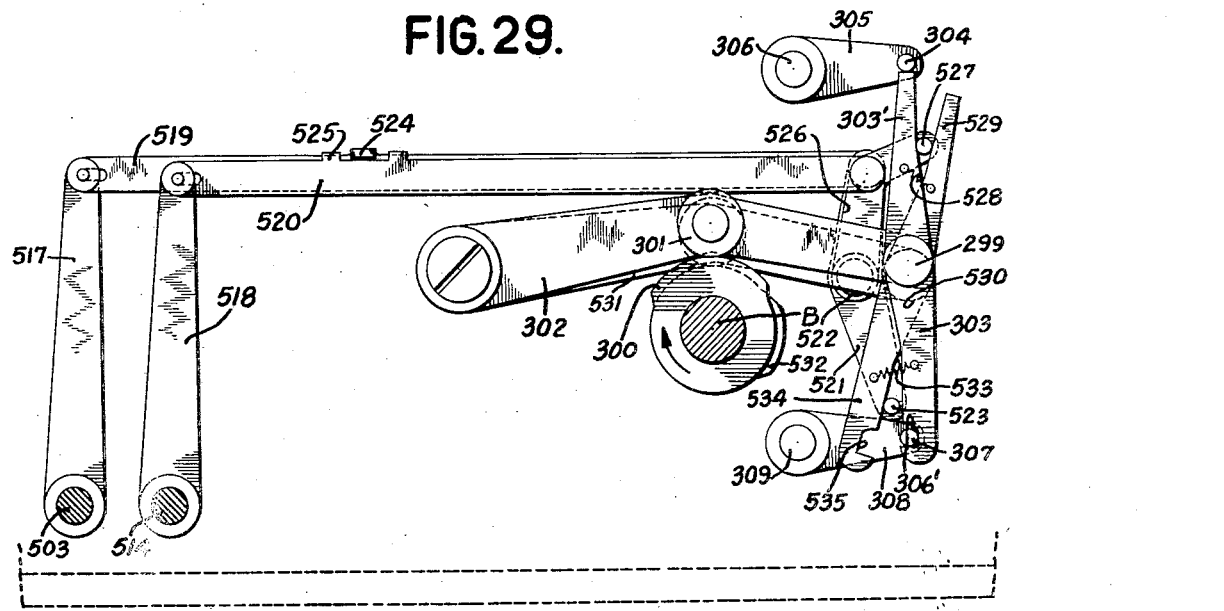
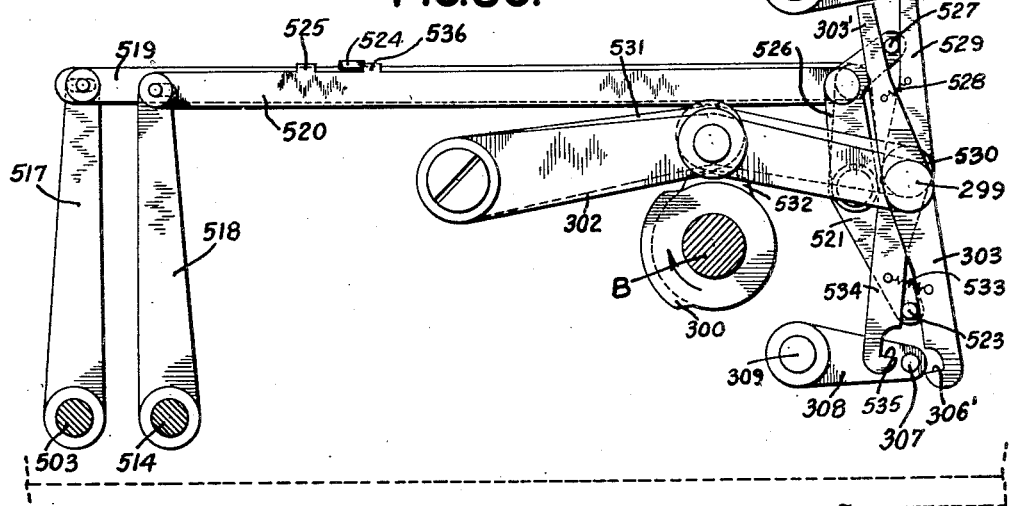

Aug. 6, 1935.  J. R. PEIRCE  2,010,642
ACCOUNTING MACHINE
Filed Jan. 7, 1930  21 Sheets-Sheet 15
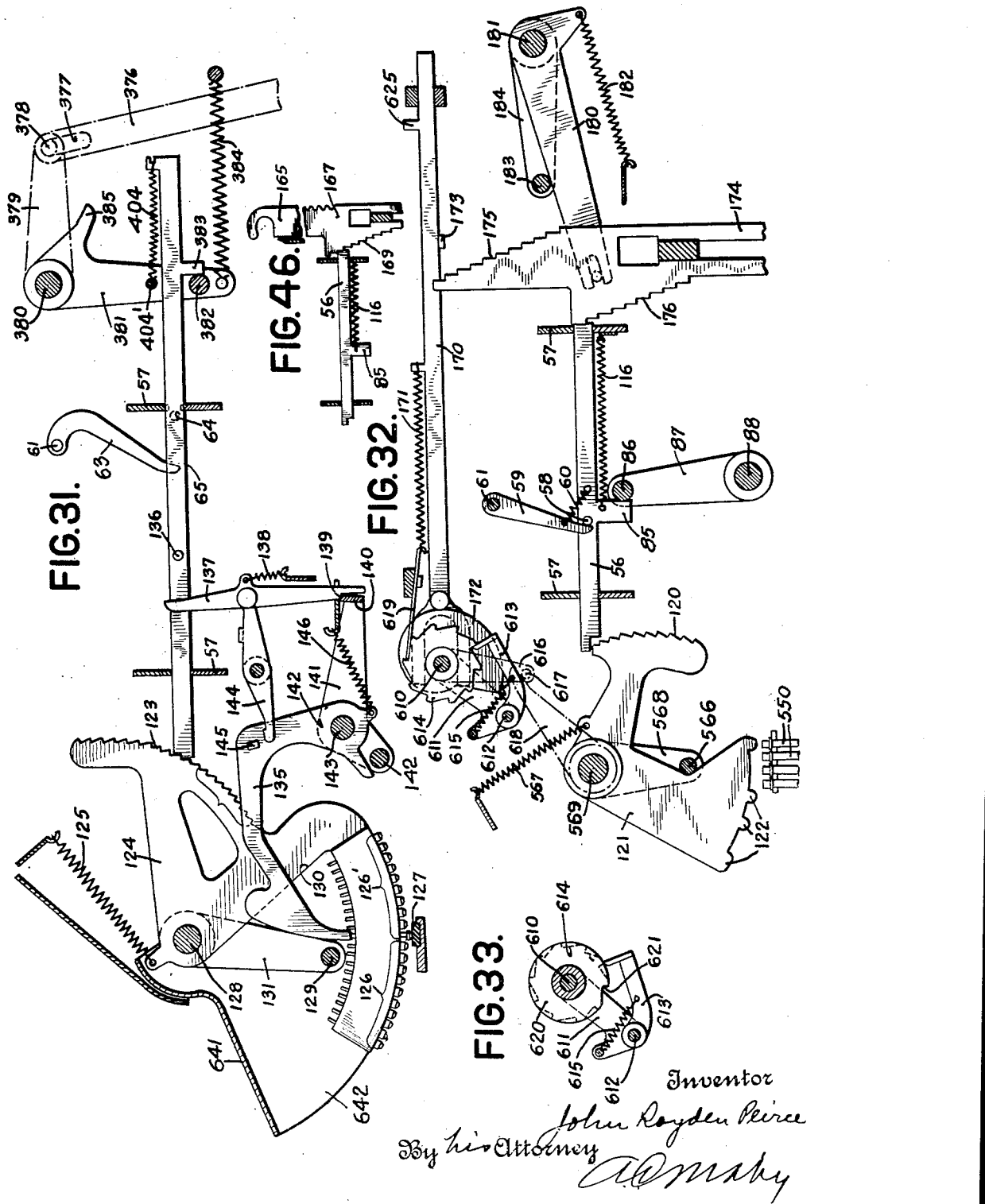

Aug. 6, 1935. J. R. PEIRCE 2,010,642
ACCOUNTING MACHINE
Filed Jan. 7, 1930 21 Sheets-Sheet 16
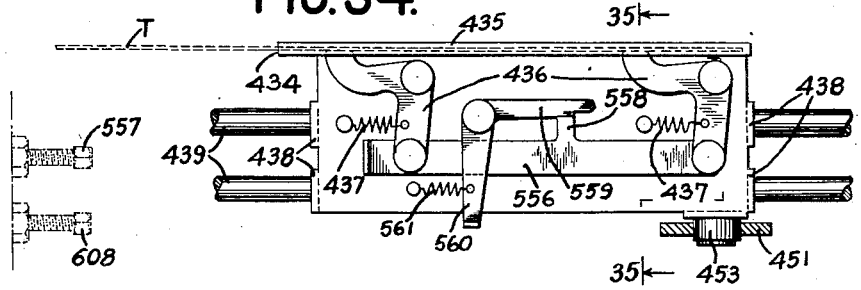
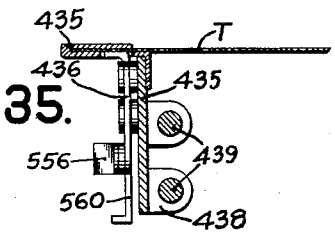
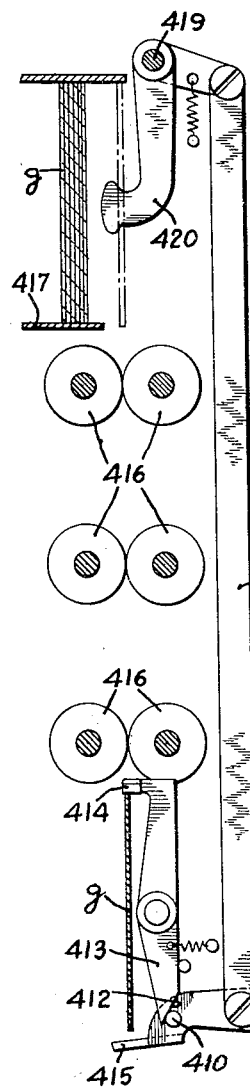
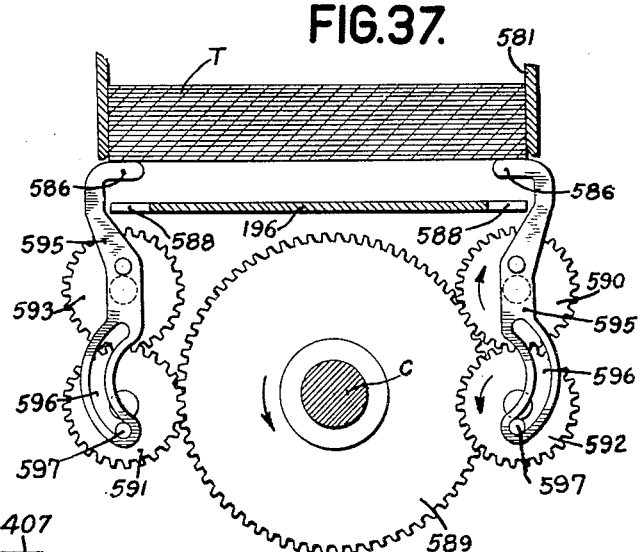
Inventor
John Royden Peirce
By his Attorney Aug. 6, 1935.  J. R. PEIRCE  2,010,642
ACCOUNTING MACHINE
Filed Jan. 7, 1930  21 Sheets-Sheet 17
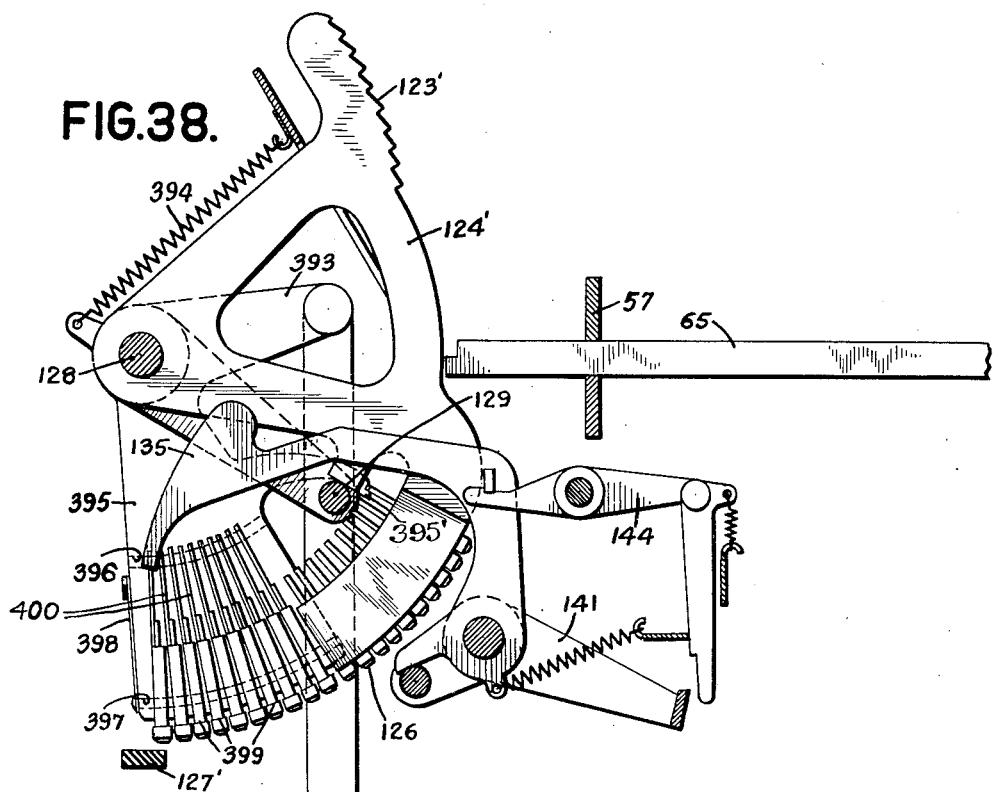
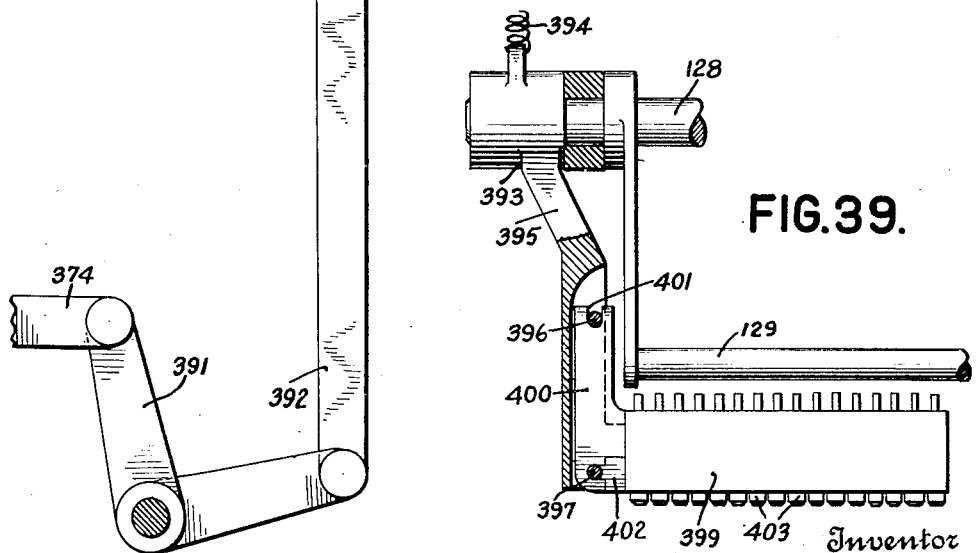

Aug. 6, 1935.  J. R. PEIRCE  2,010,642
ACCOUNTING MACHINE
Filed Jan. 7, 1930  21 Sheets-Sheet 18
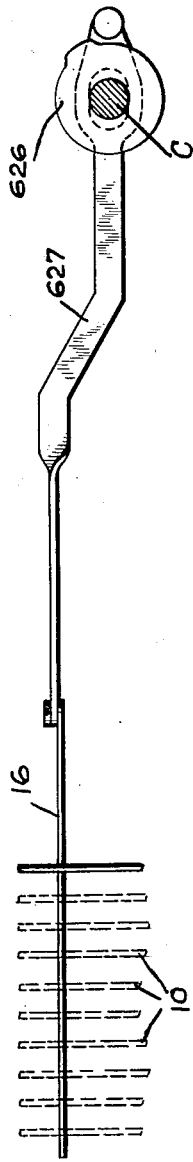
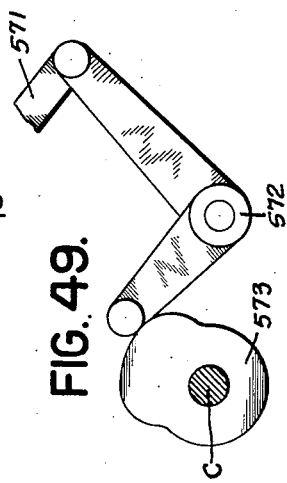
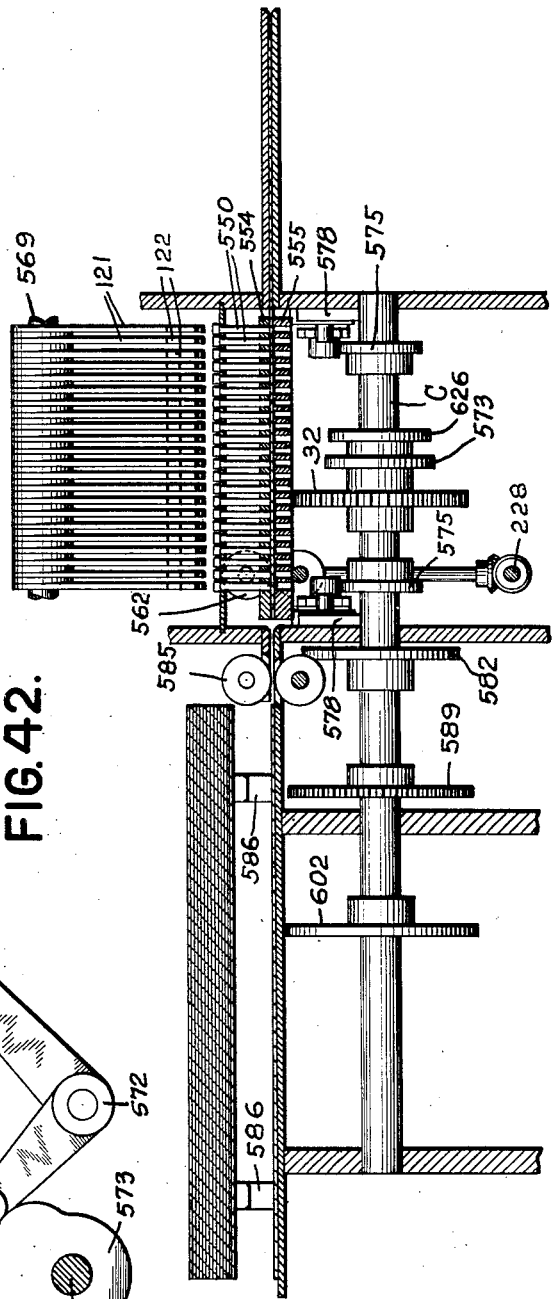

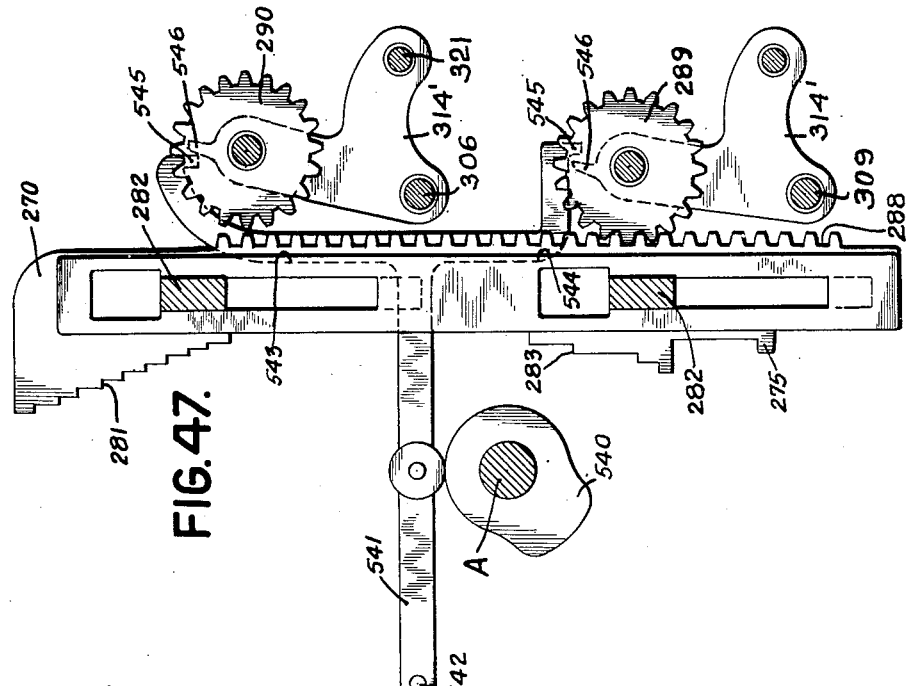

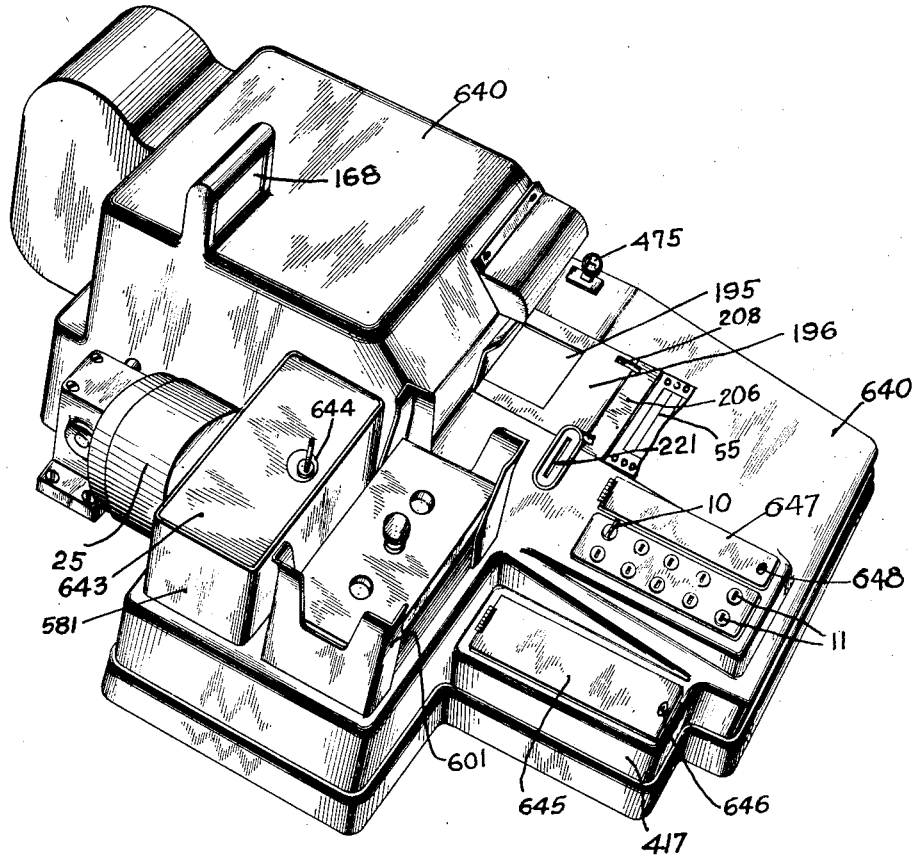

Aug. 6, 1935.  J. R. PEIRCE  2,010,642
ACCOUNTING MACHINE
Filed Jan. 7, 1930  21 Sheets-Sheet 21

INVENTOR
John R. Peirce
BY
W M Wilson
ATTORNEY

Patented Aug. 6, 1935

2,010,642

UNITED STATES PATENT OFFICE 2,010,642

ACCOUNTING MACHINE

John Royden Peirce, New York, N. Y., assignor, by mesne assignments, to International Business Machines Corporation, New York, N. Y., a corporation of New York Application January 7, 1930, Serial No. 419,030

38 Claims. (Cl. 235—58)

This case relates to machines for making records, especially of sales transactions.

In making a sale, the clerk ordinarily has control of the price recording means and the means for recording related data.

The object of this invention, in general, is to provide a device which will automatically record the price of articles sold and related data without the clerk performing other than routine operations.

Further, the object is to provide means which will automatically record on a tabulating card the data of the sale in a form such that the card may later control automatic accounting machines in accordance with the data thereon.

Still further, the object is to provide means for cooperating with a record which is detached from the article sold and inserted in the machine to automatically control the making of a separate record.

Another object is to provide a record of the clerk making the sale and related data under control of the operator's individually assigned key.

Still another object is to make a record of the sales on removable sales slips or checks simultaneously with the making of the record on the tabulating card.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a top view of the machine with the cover removed.

Fig. 2 shows a tabulating card on which a record has been made by the machine.

Fig. 3 shows a sales slip or check on which a similar record has been made.

Fig. 4 shows a tag attached to the article before it is sold.

Fig. 8 is a section on line 8—8 of Fig. 1.

Fig. 9 is a detail of the tag ejector.

Fig. 10 is a section on line 10—10 of Fig. 1.

Fig. 11 is a detail of the card feeding rolls taken on line 11—11 of Fig. 12.

Fig. 13 is a section on line 13—13 of Fig. 1.

Figs. 14, 15, and 16 are sections on lines 14—14, 15—15, and 16—16, respectively, of Fig. 13.

Fig. 17 is a detail of a latch for an operator's key.

Fig. 18 is a detail of the means for controlling the printing of the name of the article sold.

Figs. 19 and 20 are sections on lines 19—19 and 20—20, respectively, of Fig. 18.

Fig. 21 is a side view of a detail part of the article name printing control means.

Fig. 22 is a section on line 22—22 of Fig. 18.

Fig. 23 is a side sectional view showing the tag control of the cam shaft B.

Fig. 24 is a side view of the check and card feeding means.

Fig. 25 shows the carbon sheet arrangement.

Fig. 26 is a detail of price analyzing pins and members controlled thereby.

Figure 27:
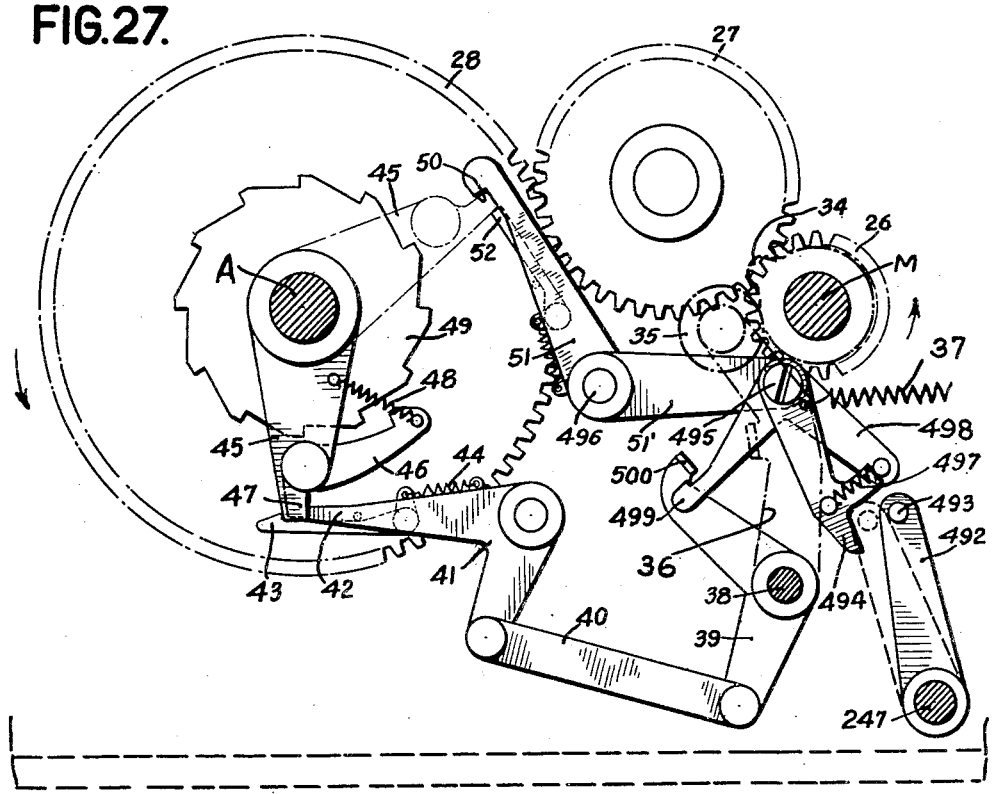

Fig. 27 shows the means for setting cam shaft A in operation.

Figure 5:
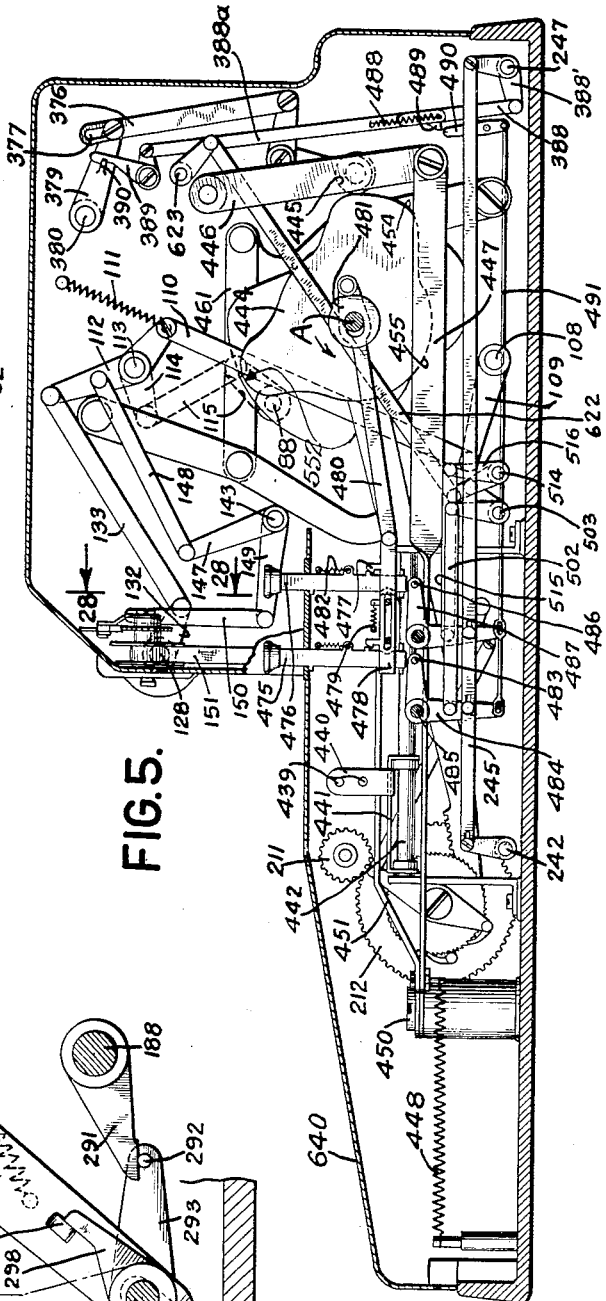
Fig. 5 is a side section of the machine on line 5—5 of Fig. 1.
Figure 28:
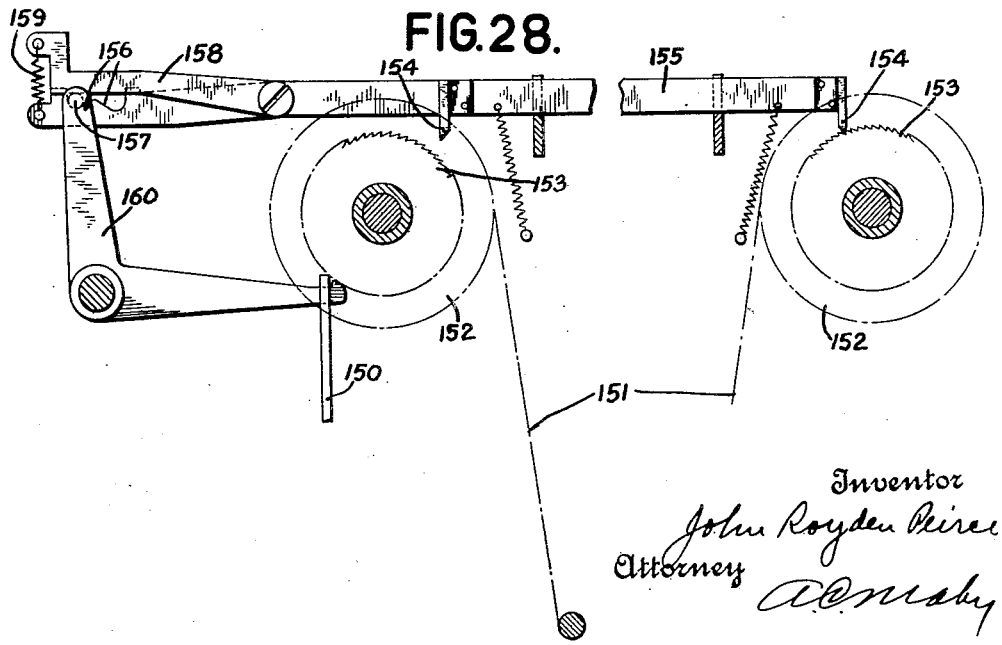

Fig. 28 is a section on line 28—28 of Fig. 5.

Figs. 29 and 30 are similar views of means controlled by total keys for meshing the accumulator with control bars upon taking totals.

Fig. 31 is a detail of a control for the printing means.

Fig. 32 is a detail of a punch member control.

Fig. 33 is a detail of Fig. 32.

Figure 12:
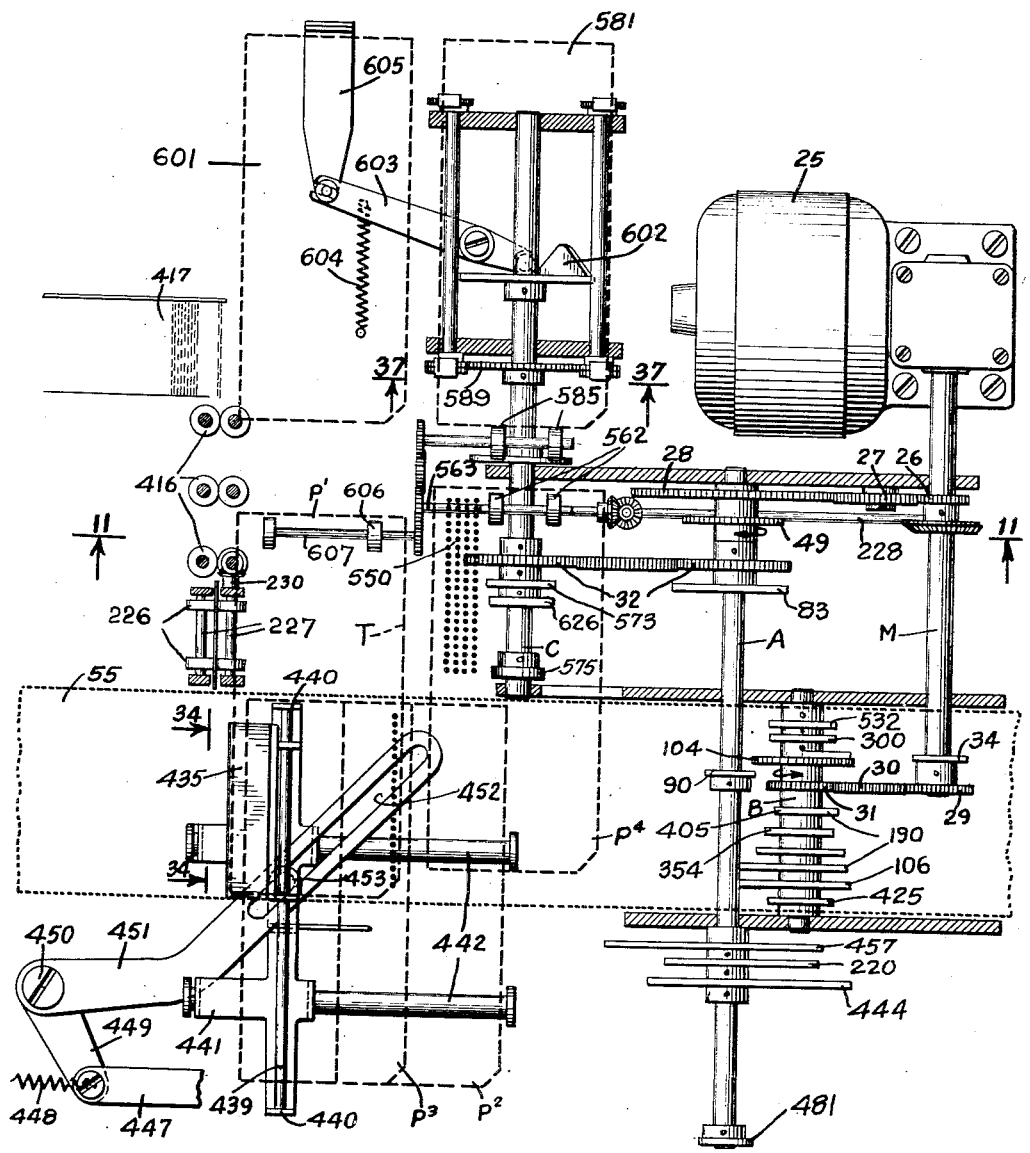
Fig. 12 is a plan section showing driving means for the various parts of the machine.

Fig. 34 is taken on line 34—34 of Fig. 12.

Fig. 35 is taken on line 35—35 of Fig. 34.

Fig. 36 shows ejecting means for the tag.

Fig. 37 is taken on line 37—37 of Fig. 12.

Fig. 38 is a side detail view of a modification of the printing means.

Fig. 39 is a detail sectional view of the modified printing means.

Fig. 40 shows the combination code used in the machine.

Fig. 41 shows a detail of a control member positioned in accordance with the contour of an operator's key.

Fig. 42 shows a detail of the punch effecting and card delivering means.

Fig. 43 shows a detail of means for operating the punches.

Fig. 44 shows a detail of the means for controlling unlatching of the operator's key.

Fig. 45 shows a detail of the card magazines.

Fig. 46 is a detail of a date or department control member.

Fig. 47 is a detail of means for holding accumulators in mesh during a total operation.

Fig. 48 is a perspective view of the machine.

Fig. 49 is a detail of the means for positioning the punch interposer members.

Figure 50:
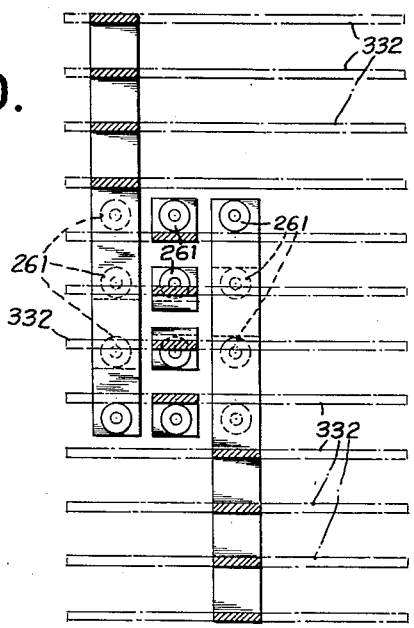

Fig. 50 is a section on line 50—50 of Fig. 18, and

Figure 51:
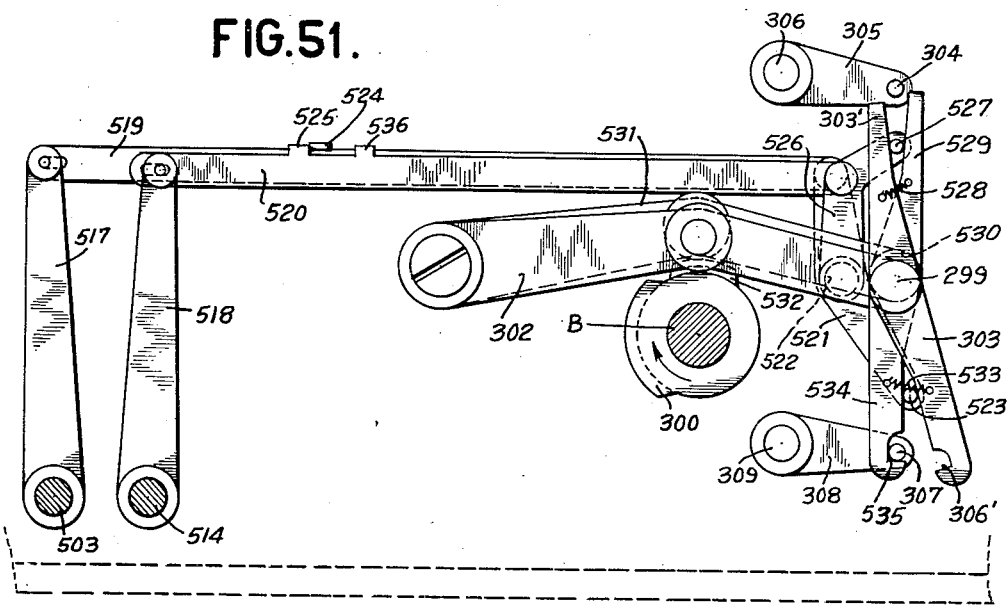

Fig. 51 is a view similar to Figs. 29 and 30, indicating a different stage of operation.

The system employed in recording sales by the machine is as follows:

Each article on sale has a sales ticket, part of which is detachable and provided with perforations denoting the name and price of the article. Each operator is assigned an individual key which may be inserted in the machine in different positions depending on whether the sale is C. O. D., cash, etc. The term "key" as used throughout embraces any suitable record member, such as an ordinary key check, tag or token, or any other distinctively characterized equivalent member. When a clerk sells an article, he first inserts his key in the machine in a position depending on the kind of sale. He then inserts the detached tag in the machine. The insertion of the key starts the machine. The tag, however, is not moved to control position until a first printing operation is effected. When the key is inserted and the machine started, mechanism cooperates with the contour of the key and feels its position to determine the clerk's identity and the kind of sale. The machine has a punching section and a printing section. Only the printing section is operated when the key is first inserted and the clerk's number and the kind of sale is printed. The tag then is free to move to a control position and controls printing of the name and price of the article from which it has been detached. Then the tag is ejected to an inaccessible receptacle. Printing is effected on both tabulating card and duplicate and original checks or receipts. After all the tags pertaining to a single transaction have been inserted and ejected, the operator presses a sub-total key which causes the printing means to print the total price of the articles on both checks and card and then punches the card with the operator's number, kind of sale, date, department, total price, and check number. The card is then ejected to an inaccessible receptacle while the check is fed out of the machine and given to the customer. After this, the machine ejects the operator's key and stops.

A detailed description follows:

Each operator is assigned a key 10 (Fig. 13) having a contour different for each operator and sensed by mechanism later to be described for identifying the operator making a sale.

Referring to Figs. 1 and 13 to 17, the machine is provided with ten slots 11 arranged in two parallel rows of five each. When an operator makes a sale, he inserts his key 10 in one of the slots selected in accordance with the kind of transaction effected. Thus one slot is designed to record C. O. D. sales; another slot, cash sales; another, charge sales; etc., and one slot is used in making a grand total record as will be hereinafter described. When a key 10 is fully inserted in a slot 11, it engages an arm 12 to move it to the rear against the resistance of a spring 13 (Fig. 13). Connected to the arm is a latch 14 (Figs. 13 and 17) which coacts with a lug 15 on a slidable bar 16 to normally hold the bar in retracted position shown in Fig. 14. Upon arm 12 moving to the rear, it disengages latch 14 from lug 15, permitting a spring-influenced lever 17 to move the bar towards the slots 11. The bar has a plurality of projections 18, each opposite a slot, which when the bar is moved as described enter the slots. If a slot is occupied by a key 10, a projection 18 will move into a hole 19 in the key and hold it in the slot for subsequent operations.

Arm 12, upon moving to the rear, also actuates a spring blade 20 towards the blade 21 and thereby effects closing of contacts 22. The latter thereupon complete a circuit through motor 25 (Figs. 1 and 12) which sets the latter in operation.

Operated continuously by the motor is a main shaft M (Fig. 12). This shaft is provided with a gear 26 which through idler 27 drives a gear 28 freely rotatable on a cam shaft A. Another gear 29 on shaft M drives, through an idler 30, a gear 31 freely rotatable on a cam shaft B. The ratio of the gearing between the shafts M, A, and B is such that shaft B is adapted to rotate four times as fast as shaft A. A third cam shaft C is provided which is driven through one to one gearing 32 from shaft A.

Whenever a key 10 is inserted, the motor 25 is set in operation and releases shaft A for a third of a revolution in the following manner.

Referring to Fig. 27, the shaft M is provided with a cam 34 which periodically engages a follower 35 on the free end of an arm 36 and moves the arm against the resistance of a spring 37. The arm is fast to a shaft 38, rocking the latter counterclockwise when moved outwardly by cam 34. Fixed to shaft 38 is a bell lever 39 which is connected by a link 40 to a bell lever 41. The outer arm 42 of lever 41 is provided with a latch 43 which is urged clockwise (as seen in Fig. 27) by a spring 44. Held between the hook of the latch 43 and the blunt end of arm 42 is the outer end of an arm 45 fixed to shaft A. A pawl 46 is pivoted to the arm 45 adjacent its outer end and has its tail 47 in engagement with the blunt end of arm 42 which thereby prevents a spring 48 from moving the pawl nose into engagement with the ratchet gear 49 fixed to continuously rotating gear 28. When the cam 34 moves the arm 36 and thus through lever 39 and link 40, rocks the lever 41 counterclockwise the arm 42 of the latter and the latch 43 carried thereby release the arm 45 and the tail 47 of pawl 46. Spring 48 thereupon moves the nose of pawl 46 into engagement with ratchet gear 49. Rotation of gear 28 is thus communicated to arm 45 and through the latter to its shaft A. The shaft A will now make one-third of a revolution at the end of which time the free end of arm 45 and the tail 47 of pawl 46 are blocked by a projection 50 on an arm 51 and prevented from moving further. The tail 47 when blocked causes the nose of pawl 46 to disengage the gear 49, thus disconnecting shaft A from gear 28. A spring-pressed latch 52 pivoted to arm 51 prevents return motion of arm 45.

It is seen from the above that each time a key 10 is inserted in a slot 11, the key is locked therein and motor 25 set in operation to cause a cam 34 on the main shaft M to initiate a one-third revolution of shaft A.

During this portion of its revolution, the cam shaft A causes the positioning of control combs in accordance with the contour of the key 10 and the slot it occupies. Since the contour of the key determines the operator's number and the position of the slot determines the kind of transaction, the control combs will be positioned in accordance with the operator's number and the kind of transaction. In turn, the combs control the position of printing members adapted to print the operator's number and the kind of transaction. The actual printing is effected under control of a cam on shaft B which is set in operation by shaft A during its first third of a revolution.

At the beginning of a recording operation, line r of checks 55 (Fig. 3) is in position for receiving an imprint. The clerk's number and kind of transaction as well as the date, department and check number are printed in this line. All or any of this data which is supplementary to the recording of amounts, to be later explained, may be considered as supplementary, classification, or identifying data which classifies, denotes, or identifies common facts or bases on which to group the records, such as a check 55 and the tabulating card T (Fig. 2) to be later referred to.

The positioning of printing means to print the above data in line r is effected by the following means:

Referring to Figs. 1 and 10, a plurality of parallel bars 56 are slidably mounted in frame members 57. Each bar is provided with a pin 58 against which the lower end of a finger 59 is held in engagement by a spring 60 (Fig. 32). The upper end of each finger is fixed to one end of a transverse shaft 61, journaled in a frame 62. On the opposite end of the shaft 61 is fixed a finger 63 similar to finger 59 (Fig. 8). The lower end of finger 63 engages a pin 64 on a bar 65 similar to bar 56 (Figs. 8 and 31).

It is apparent from the above that if a bar 56 is moved to the right, it will draw after it the finger 59 which through shaft 61 will rock finger 63 and cause the latter to move the corresponding bar 65 a distance equal to the movement of bar 56.

The pins 58 on five such adjacent bars 56' (Figs. 1 and 41) extend on both sides thereof. Coacting with each pin 58 on the side of the bar opposite the finger 59 is the upper end of a lever 67 (Figs. 10 and 41) freely pivoted on a shaft 68. The lever is held in engagement with the pin by a spring 69 between the bar and the lever. The lower end of each lever 67 is connected to a bar 70 the free end of which is bent vertically downward.

Each of four of these ends pass through slots 71 in a pair of combs 72 (Fig. 16). The remaining bar 70 has its free end 70' engaged with a comb 73 (Fig. 15).

The combs 72 are adapted to coact with the key 10 to determine the number corresponding to the clerk making the sale while comb 73 is designed to engage the key to determine the kind of transaction. The combs 72 occur in four pairs, each pair being equivalent to a single denominational order member having a ten step movement. Each comb 72 has opposite each slot 11 a projection 74 formed with five steps 75. The combs 72 are adapted to be advanced towards the key in one of the slots 11 by spring-actuated levers 76 coacting with pins 77 on each comb. The combs will move until they engage the key. In accordance with the contour of the latter, the steps 75 differentially position the combs so that each denominational order pair of combs may take one of ten positions as determined by the numeral in the corresponding denominational order column of the clerk's number.

The comb 73 has a lug 78 opposite each of the ten slots 11. The distance between each lug and the slot opposite is different from the distance of the other lugs 78 from their slots. Thus when bar end 70' permits, the comb 73 is moved by a spring-actuated lever 79, similar to levers 76, towards the slots until a lug 78 engages the side of a key 10 in one of the slots 11. The comb 73 is thus adapted to take either one of ten positions according to which slot the key occupies. Each slot is used for a different kind of transaction, as already stated, so that the differential movement of comb 73 selects mechanism in accordance with the kind of transaction effected.

Referring to Fig. 10, it will be seen that levers 67 and consequently bars 70 are held from moving by a rod 80 extending across the front of the levers 67 and carried between the upper ends of arms 81 fixed to shaft 68. The shaft has fixed to it a follower arm 82 which is held in contact with a cam 83 on shaft A by a spring 84.

During the initial third of a revolution of shaft A, the cam 83 permits the arm 82 to move downwardly, thus effecting clockwise rocking of shaft 68 and withdrawing rod 80 from levers 67.

The levers 67 being no longer restrained will be moved by spring-actuated levers 76 and 79 through combs 72 and 73, respectively, until stopped by the key 10. The bars 56' will be moved correspondingly by levers 67 and take differential positions according to the control of the key and the slot it occupies. In moving to differential position, bars 56' draw after them fingers 59 which through shafts 61 and fingers 63 cause corresponding movement of associated bars 65'.

The bars 56 which are adapted to be positioned in accordance with the date, department, and check numbers, as well as the bars 56 which are controlled in accordance with price data, as will be hereinafter described, are provided with lugs 85 engaged by a common rod 86 mounted on the upper ends of arms 87 fixed to a shaft 88 (Figs. 10 and 32). In order for bars 56 to move to the right (as viewed in Fig. 10) rod 86 must be withdrawn from lugs 85. This is effected under control of shaft B which is set in operation by shaft A during the initial third of a revolution of the latter.

The manner in which shaft B is set in rotation by shaft A will be described with reference to Figs. 12 and 23. Shaft A has a pair of similar cams 90 and 90' (cam 90' can be seen in Fig. 23 but not in Fig. 12). As the shaft A begins its rotation, the cam 90 engages a roller 91 on a link 92 connected to an element 93 and causes the latter to move clockwise on its pivot pin 94. The latter is carried by the upper end of a bell lever 95 freely pivoted on shaft 38, previously mentioned. Element 93 draws after it, through a spring 96, a lever 97 also pivoted on pin 94. The lever 97 being rocked clockwise brings a projection 98 on its left end (as seen in Fig. 23) into engagement with a lug 99 on the arm 36 periodically oscillated by cam 34 on the main shaft M as previously described in connection with Fig. 27. Upon being rocked away from the shaft M the arm 36 through engagement of lug 99 with projection 98 moves lever 97 bodily in the same direction. This causes counterclockwise movement of bell lever 95 withdrawing projection 100 from the free end of an arm 101 and the tail of a pawl 102 pivoted to said arm. The pawl is thereupon moved by a spring 103 into engagement with a ratchet wheel 104 fixed to constantly rotating gear 31. The ratchet wheel through the pawl 102 moves the arm 101 with it and the arm being fixed to shaft B, the latter will rotate. Before the shaft B completes a revolution, the cam 90 has released roller 91 and permitted link 92, element 93, lever 97 and bell lever 95 to return to initial positions. Hence, when shaft B has completed its first revolution, pawl 102 and arm 101 will again be blocked by projection 100 on bell lever 95, thus unclutching shaft B from the gear 31.

Shaft B carries a cam 106 which is engaged by the free end of an arm 107 fixed to a shaft 108 (see Fig. 8). During the rotation of shaft B the cam 106 permits arm 107 and shaft 108 to rock clockwise. Referring to Fig. 5, shaft 108 has fixed thereto an arm 109 connected by link 110 to a spring 111 which forces the upper end of arm 107 to follow cam 106. Link 110 is pivoted to a lever 112 fixed to shaft 113 to which is also fast an arm 114 connected by linkage 115 to shaft 88.

Shaft 88 is rocked clockwise by the connections therefrom to shaft 108 and in so doing moves the rod 86 (Fig. 10) carried by the arm 87 fixed to shaft 88 away from lugs 85 of bars 56. The latter are now free to move under the influence of springs 116 (Figs. 10 and 32).

The forward ends of bars 56 and 56' are notched to cooperate with ratchet teeth 120 on members 121 carrying punch selecting lugs 122 (see Fig. 32). The forward ends of bars 65 and 65' are also notched to cooperate with ratchet teeth 123 on type carrying members 124.

Bars 56, 56', 65 and 65' serve to control the positions, respectively, of punch selecting members 121 and type carrying members 124.

While bars 56, 56' and 65 and 65' are moving to the right (as viewed in Figs. 5, 31, and 32) type carrying members 124 are by means to be described hereinafter released for movement under the influence of springs 125. Each member 124 will thereupon rock clockwise relative to the common shaft 128 until a ratchet tooth 123 engages the notch in the forward end of an associated bar. The members 124 are thus set differentially according to the positions of bars 65 and 65' and when arrested a type element 126 corresponding to the control movement of bar 65 or 65' is in printing position over platen 127.

Normally, the members 124 are prevented from moving by a common rod 129 extending across the members 124 in engagement with the sides 130 thereof (Figs. 1, 8, and 31). The rod 129 is mounted on the free ends of arms 131 fixed to shaft 128. Referring to Figs. 1 and 5, shaft 128 has fixed thereto an arm 132 which is connected by link 133 to the upper end of lever 112. As previously described in connection with the rocking of shaft 88 to release bars 56 and 65, cam 106 on shaft B causes lever 112 to move counterclockwise. Link 133 thereby actuates arm 132 and shaft 128 in a clockwise direction. The rod 129 thereupon withdraws from sides 130 of members 124 permitting the springs 125 to set the members according to the positions of bars 65 and 65'.

After the members 124 are arrested with the selected type element 126 in position over platen 127, the hammer 135 must be operated to strike said element 126 and effect printing. Referring to Figs. 8 and 31, when a bar 65 moves to the right, the pin 136 thereon which has been holding back lever 137 from moving under force of spring 138, withdraws from the lever and permits the spring 138 to rock it so that the edge 139 thereof engages the top of a common bar 140. The latter is integral with arms 141 of bail 142 fixed to shaft 143. When the bail rocks counterclockwise, bar 140 moves lever 137 upwardly, swinging lever 144 connected thereto counterclockwise. The free end of lever 144 thereupon releases a lug 145 on hammer 135 and permits a spring 146 to rock the hammer freely counterclockwise on shaft 143 and cause printing.

To rock bail 142 counterclockwise and cause printing as above described, the shaft 143 has fixed thereto an arm 147 (Fig. 5) which through link 148 is connected to lever 112. Thus when the latter is caused to rock counterclockwise under control of cam 106 on shaft B, the link 148 and arm 147 actuate shaft 143 and bail 142 similarly to effect printing.

Shaft 143 also has fixed thereto an arm 149 which through link 150 is connected to mechanism for feeding the ribbon 151 after each printing operation. The ribbon feeding mechanism is shown in Fig. 28. The ribbon is carried by spools 152 provided with ratchet teeth 153. One of the spools has its ratchet teeth engaged by a cooperating dog 154, the other dog 154 being held out of engagement with the ratchet teeth of the other spool. The dogs are carried by a slidable bar 155 provided at one end with a pair of notches 156. Positioned in either of the notches is a pin 157, yieldingly held in the notch by a latch 158 influenced by a spring 159. The pin 157 is carried by the upper end of a bail 160 to the other end of which the link 150, previously referred to, is connected. When the link 150 is moved downwardly upon rocking of shaft 154 (see Fig. 5), bail 160 is rocked clockwise. In Fig. 28, the bail 160 has completed its clockwise movement and causes the right hand dog 154 to rotate the associated spool 152. During the return of link 150 and bail 160, the bar 155 is moved to the left but not sufficiently to cause the left hand dog 154 to rotate the associated spool. When left hand spool 152 is completely unwound, the other spool will resist actuation by right hand dog 154 and pin 157 consequently will move into the right hand notch 156. Thus when the bail 160 returns, it will cause bar 155 to move further to the left by the distance between notches 156. Hence, the left hand dog 154 will engage and rotate the associated spool, reversing the ribbon feed.

The elements controlled by cam 106 of shaft B have thus far been described. It has also been explained that bars 56' are differentially positioned according to the key 10 during the first revolution of shaft B initiated by shaft A so that the members 124 for printing the clerk's number and the kind of transaction have been differentially set. Simultaneously with the differential setting of the above members 124, it is also necessary to differentially set the members 124 for printing the date, department, and check number, so that all the classification data for column $r$ of the check 55 (Fig. 3) may be simultaneously printed therein.

The date and department bars 56 are controlled by manually set members 165 (see Figs. 1 and 10). Members 165 are vertically slidable and held in adjusted positions by pawls 166 engaging notched edges 167 of the bars. The usual indexes are provided on the front of the bars and are visible through opening 168 in the casing through which members 165 may be manipulated. Each member 165 (see Fig. 46) is provided with a series of ten steps 169 and when the bars 56 in line with the members 165 are released by rod 86 and permitted to move under the influence of springs 116, the bars will engage one of the notches 169 and position themselves accordingly. Hence the connected bars 65 will be differentially positioned and arrest the associated members 124 in position for printing the numbers represented by the setting of the members 165.

The bars 56 controlled by the check number are positioned by mechanism shown in Fig. 32. A series of slidable bars 170 (see also Fig. 1) have the forward ends normally urged by springs 171 into engagement with cams 172. Each bar 170 has a lug 173 which when a member 174 is moved upwardly abuts one of the ten steps 175 on the rear edge of the member. The latter is thus differentially positioned according to the location of lug 173 relative to steps 175. The location of lugs 173 is controlled by snail cams 172 which are moved each time a new check 55 is fed into position to receive an imprint in column r, as will be presently described. The front edge of member 174 has a series of ten steps 176 corresponding to steps 175. When the bars 56 in line with members 174 are released by rod 86, they will move to the right until stopped in differential positions by one of the steps 176. The corresponding bars 65 and printing members 124 will be similarly differentially arrested for printing the check number.

The bars 174 are moved upwardly by arms 180 freely mounted on shaft 181 and actuated by springs 182. Initially, however, the arm 180 is prevented from moving by a rod 183 (Figs. 1, 10, and 32) carried by arms 184 fast to shaft 181. The shaft 181 has fixed thereto an arm 185 (Figs. 1 and 10) which is connected to a link 186 pivoted to an arm 187 fast on a shaft 188. Referring now to Fig. 8, shaft 188 has fixed thereto an arm 189 engaging a cam 190 on shaft B. As the shaft B makes its first revolution, a spring 191 (see Fig. 10) connected to arm 185 causes the arm 189 to follow cam 190 and rock clockwise. The shaft 188 rocks correspondingly and through arm 187 and link 186 actuates arms 184 to withdraw rod 183 from arms 180 permitting springs 182 to rock the arms clockwise and raise members 174.

Thus far, the operations taking place only upon the insertion of a key 10 in a slot 11 have been described. Summarizing briefly, the shaft A has been permitted one-third of a revolution. In turn, shaft A has released shaft B for a complete revolution. Cam 83 on shaft A has released bars 56' for movement under control of combs 72 and 73 according to the contour of the key 10 and the location of the slot containing the key to thereby set the printing members 124 for printing the clerk's number and kind of transaction. The bars 56 associated with the date, department, and check number controls have been released by cam 106 on shaft B and set by their respective controls. Printing has then occurred under control of the same cam 106.

To begin with, as already stated, the check 55 has been positioned in the machine at the end of a previous recording of a transaction so that line r is in printing position. The portion 194 of the check below the line r at this time is visible through an opening 195 (Fig. 1) in horizontal frame plate 196 and the data such as name and address of the customer may then be filled in by the operator. After printing has taken place in line r, as described above, the checks 55 must be fed forward to line s. This is done by shaft A as the latter nears the end of its initial third of a revolution.

Referring to Fig. 8, the checks 55 are in web form wound up in a roll 198 carried by a freely rotatable shaft 199. A similar roll 200 supplies a duplicate web of checks. Both webs are led between guide plates 201 (Fig. 8). The original and duplicate webs are thereafter separated by a plate 202 in order to facilitate the insertion of a carbon sheet 203 between them. A second carbon sheet 204 is inserted between the duplicate web and a tabulating card T (Fig. 2) and both carbon sheets are supplied from the double wound roll 205 (Figs. 1, 10, and 25). Feeding of the carbon sheets is effected by manually pulling on their free ends. After passing plate 202, the webs 55 and card T are disposed over the platen 127 beneath type elements 126. They are then fed beneath the frame plate 196 of the machine housing and a plate 206, the forward end of which serves as a straight edge on which the checks may be severed (Figs. 1, 8, and 48). Both webs are provided with holes at the edges to receive the teeth 208 of two feed wheels 209 fast to the opposite ends of a shaft 210. The right hand end of this shaft (as viewed in Fig. 1) has fast thereto a pinion 211 in mesh with a gear 212 rigidly carrying a ratchet wheel 213 adapted to be driven by a pawl 214 (see Fig. 24). The pawl is carried by the free end of an arm 215 fixed to the hub of a gear 216 loose on the shaft carrying gear 212. In mesh with gear 216 is a rack 217 formed integral with the end of a link 218 having a roller 219' forced by a spring 219 to follow the contour of a cam 220 on shaft A. The relation of these parts at the beginning of the movement of shaft A is shown in Fig. 24. As the shaft approaches the end of its initial third of a revolution, the cam moves the link 218 to the left against the resistance of a spring 219. Rack 217 will thereupon rotate gear 216 and through pawl 214 rotate ratchet 213, gears 211 and 212 and shaft 210 and wheels 209. The sheets 55 will thereby be advanced in the direction of the arrow in Fig. 3 until the first of lines s is in position over platen 127.

Thus far, operations effected upon insertion of the key 10 only have been described. The operation of the machine under control of a sales tag G will now be described.

The tags G (Fig. 4) are attached to each article on sale and comprise two portions g and g' separated by a perforated dividing line. The latter portion has printed thereon the kind and color of material, the size and price of the article, the serial number of the tag, the department number, and a code number representing the kind of article. Thus a dress will be represented by code number "226". The portion g of the tag has printed thereon the serial number of the tag and the price. In addition, the code number is punched in the first three columns from the left and the price is punched in the last six columns. It is understood that the code number may occupy one to three denominations and that the price may be a one to six denomination number.

When the operator makes a sale, he tears off portion g of the tag, leaving g' attached to the article. After inserting his key 10 in the slot 11 corresponding to the kind of transaction, he inserts the tag g in the holder 221 of the machine (Figs. 1 and 10). As will be hereinafter described, the perforations in the tag control the same printing members 124 as are under control of the date, department, check number members, and the key controlled combs. In order to prevent a conflict between the tag control of the members 124 and the other mentioned controls thereof, the shaft A during its initial third of a revolution prevents insertion of a tag in slot 221 until the shaft B has completed its first revolution.

Referring to Fig. 23, the shaft A has thereon a cam 222 which while shaft B is making its first revolution coacts with a roller 223 on a shutter arm 224 to keep the arm across the slot of holder 221, thus preventing a tag from moving down into control position. As the shaft A approaches the end of its third of a revolution, cam 222 permits spring 225 to withdraw the shutter 224 from the slot in holder 221 so that the tag drops into the bite of feed rolls 226 carried by shafts 227.

The motor 25 is in rotation and main shaft M is constantly rotating shaft 228 (Fig. 11) which through gears 229 rotates shaft 230 geared to shafts 227 carrying the feed rolls 226. The latter seize the inserted tag and feed it down so that the bottom of the tag abuts and moves the end of an arm 231 on a bell lever 232 downwardly. Thus the bell lever is rocked clockwise against spring 233 and thereby moves a guard plate 234 integral with arm 235 of the bell lever across the chute slot. The insertion of a second tag while the first tag is in the holder is thus prevented by plate 234.

Arm 237 of bell lever 232 has a hook 238 at the end for initially latching an arm 239 in its upper position shown in Fig. 10. When the bail is rocked clockwise by tag g, the hook 238 moves away from arm 239, permitting the spring 240 to rock arm 239 counterclockwise until stopped by a fixed pin 241 (Fig. 23). The arm 239 is fast to its shaft 242 which has fixed thereto an arm 243 having a pin and slot connection 244 with one end of a link 245. The other end of the link is connected to an arm 246 which is fast to shaft 247. Also fixed to the latter shaft is an arm 248, the upper end of which is provided with a pin 249 abutting the edge 250 of the member 93 previously described in connection with the clutching of shaft B to its driving gear under control of shaft A.

When arm 239 is released by hook 238, it rocks arm 243 to move link 245 to the left (as viewed in Fig. 23) which causes arm 248 to move counterclockwise and pin 250 to rock member 93 clockwise. As previously described, hook 98 thereupon moves into the path of oscillation of lug 99 on arm 36 actuated by cam 34 of shaft M. The lever 95 is thereby rocked and hook 100 releases the end of arm 101 and the tail of pawl 102 thus connecting shaft B to gear 31 for rotation. Near the end of a revolution of shaft B, a cam 251 thereon engages a cam follower roller 252 on the end of a link 253 connected to an arm 254 fast to shaft 242 and rocks the latter shaft clockwise. The arm 243 on shaft 242 thereupon moves the link 245 to the right releasing pin 250 from member 93 and permitting hook 98 to withdraw from lug 99. The lever 95 moves back to initial position and when shaft B has completed its second revolution, the arm 101 and the tail of pawl 102 are blocked by hook 100. The shaft B is thereby unclutched from gear 31 in the same manner as at the end of its first revolution.

It is clear from the above that each time a tag g is inserted in holder 221, the shaft B is released for one complete revolution.

The manner in which shaft B under control of the perforations in tag g effects the printing in lines s of checks 55 of the name and price of the article sold and the entry in accumulators of the price will now be explained. The tag when positioned in the holder, as shown in Figs. 18 and 23 has its six price columns in line with six columns of slidable analyzing pins 260 (see Fig. 18) each latter column containing four pins (see Figs. 10 and 26). On the opposite side of the tag from pins 260, are three columns of slidable pins 261, each column containing four pins adapted to read the perforations in the code columns of the tag, (the first three columns from the left in Fig. 4). It may be stated here that each column of the tag has four so-called index point positions a, b, c, and d, which, in the instant case, are perforated in combinations to represent the numbers 0 to 9. The combination code employed is shown in Fig. 40 which indicates that "3", for example, is designated by perforations in positions b and d of a column.

If an analyzing pin 260 or 261 is opposite a perforation, it will pass through the perforation but if there is no perforation in the tag opposite the pin, the latter will be restrained from moving. The pins are thus differentially controlled by the presence or absence of perforations and in turn are enabled to differentially control mechanism for setting up the printing and punch control members and in the case of pins 260 also control the entry of the price items in accumulators.

The control action of pins 260 will first be described, reference being had to Fig. 26 where a single column of pins is illustrated. In addition to the reading pins 260, each column contains two dummy pins 262 and 262' which are necessary to transform the combinational reading of the perforations into single hole or ten index point equivalents. The pins 260 are normally urged towards the tag by springs 263. Pins 260 are provided with alined studs 264 in contact with the front of an arm 265 fixed to a shaft 266. Pins 260 c and d are provided with alined studs 267 engaged by the arm 268 on shaft 269 but the latter arm does not prevent movement of the pins c and d except when a total operation is effected as will be presently described. Arm 265, however, normally prevents the springs 263 from moving the pins forward. Assume for the present that pins 260 have been released by arm 265 and are reading number "3" in the highest order denomination column of the price 39.50 punched in the tag g of Fig. 4, inserted in the machine. Pins 260 b and d will advance through perforations in the tag (see Fig. 4). The advance of pin 260b causes a stud 271 thereon to move bar 272 fastened to pin 262 forward against its spring 273. Another stud 274 on pin 260b moves pin 262' against its spring 273. In moving forward pin 262' withdraws its rear end from a step 275 adjacent the lower end of member 270. The latter cannot move, however, unless a projection 276 is withdrawn from step 277 on member 270. As pin b moves forward, a stud 278 at its rear end rocks arm 279 clockwise on pivot 280 carried by a member 281 slidable on the same guide posts 282 as member 270. The projection 276 which is integral with arm 279 is removed from step 277 when stud 278 rocks the arm clockwise.

Member 270 is now free to move upwardly. This it will do until a step 283 below step 277 engages the projection 276. Further movement of member 270 can now take place only if member 281 is permitted to move. The latter member has at its lower end a step 284 which is normally engaged by stud 285 on pin 262. Since the latter has been advanced, the stud is withdrawn from step 284 and the member 281 is free to move. Pin 260d has also advanced and positioned a stud 286 in the path of step 284. The member 281 will therefore move until stopped by stud 286. The movement of member 270 relative to member 281 and the further movement of member 270 together with member 281 is thus controlled by the advance of pins 260 through the perforations in the tag. The upper end of member 270 is provided with a series of ten equal steps 287. The distance between steps 277 and 283 is equal to two steps 287 and the distance between studs 285 and 286 is equal to one step 287. Thus, in the example given, the member 270 has moved a total distance equal to three steps 287 corresponding to the number "3" analyzed by pins 260. In a similar manner for each combination of perforations in a column of the tag representing a number according to the selected code the member 270 associated with said column will be permitted to move a number of steps 287 equal to said number. The positions of members 270 determine the positions of the bars 56 in line therewith. Thus when shaft b through cam 106 withdraws rod 86 from the lug 85 of a bar 56 in line with a member 270, spring 116 will move the bar towards the steps 287 which will arrest the bar in differential position depending on which step 287 is opposite the rear end of the bar. The positioning of the corresponding printing members 124 through fingers 59, 63 and bars 65 will take place in a similar manner to that outlined in connection with printing of the date, clerk's number, etc. The rear edge of member 270 is formed with rack teeth 288 spaced apart the same vertical distance as steps 287. Adapted to mesh with the teeth 288 are pinions 289 and 290 respectively of subtotal and grand total accumulators.

During the upward movement of the member 270, the pinions 289 and 290 are demeshed from teeth 288 (as shown in Fig. 10) but on the return of member 270 to its initial position, the pinions are brought into mesh and are rotated a distance equivalent to the number analyzed by pins 260.

Figure 6:
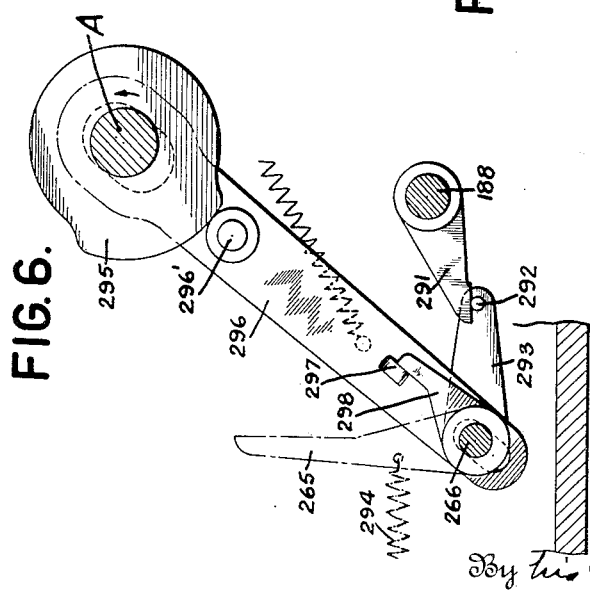
Fig. 6 is a detail of means for preventing the price analyzing pins from moving during the first part of a recording operation.

In order to withdraw arm 265 from studs 264 of pins 260 and permit the latter to perform a reading and controlling operation, the shaft 188 already described as rocked clockwise under control of a cam 190 on shaft B has connected thereto an arm 291 (Fig. 10) the free end of which rests on a pin 292 (see Fig. 6) on the end of an arm 293 fixed to shaft 266. As arm 291 rocks clockwise, it withdraws from pin 292 permitting a spring 294 (Fig. 6) to rock arm 265 counterclockwise and withdraw it from studs 264 of the analyzing pins 260 (Figs. 10 and 26) permitting the pins to advance and analyze the tag.

During the first third of a revolution of shaft A caused by the insertion of the key and the first revolution of shaft B initiated by shaft A, the insertion of a tag in the holder 221 in controlling position therein is prevented by cam 222, as explained hereinbefore. There being no tag in the holder, if the pins are released by arm 265 at this time, they will all advance and the members 270 will rise without tag control until stopped by the lower edge of guide bars 282. An undesirable number (in this case a series of nines) will thus be printed under control of bars 56 and entered in all the accumulators upon the return of members 270. To prevent arms 265 from releasing studs 264 of the pins during the first third revolution of shaft A, the latter is provided with a cam 295 (Fig. 6) which engages a roller 296' on a slidable bar 296 provided with a lug 297 adapted to engage an arm 298 fixed to shaft 266. The cam 295 acts during the first third of a revolution of shaft A to hold the lug 297 in front of arm 298, thus preventing spring 294 from rocking shaft 266 when arm 291 on shaft 188 is released from arm 293 by cam 190 on shaft B.

Assuming that the first third of a revolution of A is completed, the tag g may be inserted and the cam 295 on shaft A has released arm 265 to permit the pins 260 to analyze the tag under control of the cam 190 on shaft B.

As explained previously, the shaft 188 controlled by cam 190 on shaft B also operates the previously described linkage 187, 186, and 185 (Fig. 10) for effecting removal of rod 183 from arms 180. This permits the latter to raise the members 270 under the pull of springs 182, until stopped by the analyzing control. The relation of the various links is such that the members 270 are released after the pins 260. After the members 270 have been raised, the cam 106 on shaft B functions to cause clockwise rocking of shaft 108 (Fig. 8) thus positioning bars 56 under control of members 270. The operations of locating the printing members 124 and effecting printing and ribbon feeding are controlled from shaft 108 in the same manner as described in connection with the control from operator's key 10.

The meshing of the accumulator pinions 289 and 290 with teeth 288 of members 270 is effected during the return of the latter by a cam 300 on shaft B (see Fig. 29). During the latter part of the rotation of shaft B when the rod 183 starts to move down under control of cam 190 to return the members 270, the cam 300 engages a follower 301 on a pivoted link 302 and rocks it counterclockwise (as viewed in Fig. 29). The outer end of link 302 is pivotally connected to a pivot pin 299 on which is carried an upper member 303' and a lower member 303. The upper end of member 303' abuts a stud 304 on arm 305 fast to shaft 306. The latter is thereby rocked counterclockwise together with link 302. The lower end of member 303 has a hook 306 which engages a stud 307 on arm 308 fast to shaft 309 and rocks the latter in step with shaft 306.

Referring to Fig. 10, each of the rock shafts 306 and 309 rigidly carries arm 310 having a pin 311 at its outer end located between the sides of adjacent arms 312 freely movable on the associated rock shaft. Also located between the sides of arms 312 is a pin 313 on a plate member 314 freely movable on the associated rock shaft and having the accumulator shaft freely journaled in its upper end. A spring 315 urges arms 312 toward each other and in contact with pins 311 and 313. When shaft 306 and 309 are rocked counterclockwise, the arm 310 moves against its spring 316 and pin 311 moves the arms 312 to the left. The latter arms act on pin 313 and rock member 314 counterclockwise, thus moving the shaft of the accumulators towards the members 270 and effecting engagement of the pinions 289 and 290 with the racks 288. Upon the return of the racks, the number analyzed by the pins 260 will be entered into the accumulators.

When an accumulator wheel passes from "9" to "0" it advances the next higher order accumulator wheel one step for a transfer. This is effected as follows:

Each wheel has two series of digits 0 to 9 thereon. At diametrically opposite points, the wheel is provided with lugs 317. The wheel during entering operations rotates counterclockwise and when passing from "9" to "0" one of the lugs 317 engages and rocks on arm 318 loose on the associated rock shaft 306 or 309 clockwise against resistance of a spring 319. The arm 318 is then latched in its actuated position by a hook on the end of a member 320 freely journaled on a rod 321 carried by plates 314 and 314' between which the accumulators are mounted. The spring 319 also holds member 320 in latching position. When the members 270 are completely restored to their initial and lowermost position, the cam 300 (Figs. 29 and 30) through shafts 306 and 309 and connected linkage moves the accumulator pinions away from the racks 288.

During this movement the plates 314 and 314' rock clockwise causing rod 321 to move clockwise about the associated rock shaft 306 or 309. The arm 320 moves bodily with rod 321 and the hook thereon actuates the arm 318 clockwise. The upper end of arm 318 thereupon engages the lower end of a latch lever 322 and unhooks it from a member 323, permitting a spring 324 to rock the latter member clockwise. When the accumulator is demeshed from the rack 288, the pinion thereon engages teeth 325 on member 323. Thus when the spring 324 rocks the member 323 on a fixed shaft 323', the teeth 325 being in mesh with the accumulator pinions rotate the latter to enter "1" therein. The movement of the member 323 is limited by engagement with a pin 326 on a lever 327 journaled on shaft 323. The movement of the lever is in turn limited by a pin 328 thereon engaging the lower end of a slot 329 in a link 330 pivoted to an arm 331 fixedly carried by the rock shafts. When the rock shafts are again rotated to move the accumulator pinions towards the racks 288, the arm 331 will move the link 330 upwardly and the lower end of the slot 329 will engage pin 328 and thus rock the lever 327 counterclockwise. The pin 326 will engage the side of member 323 and move it back into latching position with respect to latch 322. In the meantime, the movement of the rock shafts will have demeshed the accumulator pinions from teeth 325 and arm 320 will have moved to the left without affecting arm 318 which will be moved by spring 319 to its normal forward position, shown in Fig. 26. A transfer has thus been completed.

If an accumulator has not passed from "9" to "0" during an entry, the arm 318 will be in forward position so that when the arm 320 is moved to the right upon demeshing of the accumulator pinion from rack 288, it will not actuate the arm 318 far enough to engage the latch 322 and unlock the toothed member 323.

The manner in which the tag perforations representing the price control the printing and accumulating thereof has been explained. While this is taking place through cams on the B shaft, the latter also causes printing of the name of the article sold, such as dress, hat, etc. This is done under control of analyzing pins 261 which read the three code columns of the tag.

Referring to Figs. 1, 10, and 18 to 22, opposite each of the three code columns are four pins 261 in line with the positions a, b, c, and d of the tag when the latter is in control position. As explained previously, there are three code columns in each tag g and three corresponding columns of reading pins 261, each column having four pins, one for each of the four index point positions of a column. Thus, there being three columns of four pins 261 each, the number of pins, all told, is twelve. For each pin there is a separate comb bar 332, the forward end of which is slidably mounted on its associated pin, all of the combs being arranged horizontal and parallel to each other in one row as shown in Fig. 21. There being twelve pins 261, there are, therefore, twelve combs 332. As indicated in Figs. 18, 20, 21, and 50, the wide main portions of the four unit combs 332 which are the four lowest combs in Figs. 20, 21, and 50 and the furthest from the observer in Fig. 18, lie below their associated unit pins 261. Consequently, they are bent upwardly in parallel planes to extend into engagement with the rear ends of their respective unit pins. The central four combs 332 are the tens combs and being substantially in line with their associated pins, their forward ends merely have small bent lugs to coact with their respective pins. The four upper combs 332 are the hundreds combs and being above their associated hundreds column of pins, they are bent downwardly at their forward ends to engage their respective pins. The rear end of a pin 261 has an enlargement 2610 which engages the forward end of the associated comb to move it with the pin when the latter advances through a perforation. A coil spring 2612 yieldably moves the comb with the pin when the latter is retracted to initial position after analysis. The spring 2612 permits a comb to move forward relative to the associated pin for a purpose which will be later described. The combs are slidably guided between the vertical sides of a box frame 333. Each comb is also guided between horizontally projecting portions 334 of these plates. The combs are formed with rectangular openings, the longer sides of which are each provided with ten lugs 335, those on one side being spaced midway of those on the opposite side.

Passing through all of the comb openings at right angles to the plane of the combs are ten vertical code slugs 336 arranged parallel to each other. The slugs are guided for vertical movement in the top and bottom sides 333' of the frame 333 (see Figs. 1 and 20). The lower end of each slug is provided with a notch 337 (Fig. 20) in which is seated a pin 338 carried by one end of a member 339. The latter is provided with two pins 340 (Figs. 20 and 22) which lie in an elongated slot 341 of arm 342 of a lever freely pivoted on a shaft 343.

A spring 344 fastened to the free end of arm 342 and to the right hand pin 340 yieldingly holds the member 339 extended relative to arm 342 and in the position shown in Fig. 20. Each arm 342 is normally urged to rock clockwise by a spring 345, and thereby through members 339 move the slugs 336 upwardly. Each of the latter, however, is normally blocked by one or more lugs 335 on the right side of combs 332 (as viewed in Fig. 20) being engaged with projections 346 on the slugs. The arrangement of the projections 346 on each slug is different, in accordance with the article represented thereby. When a code number on tag g is sensed by pins 261, the combs 332 carried by the pins which have moved through perforations will advance and the lugs 335 on the right hand side of their openings (as viewed in Fig. 20) or at the lower side of the opening (as viewed in Fig. 18) will move one step past the planes of the slugs 336 (see Fig. 18). Simultaneously, lugs 335 on the other side of the combs will move into the planes of the code slugs. The arrangement of projections 346 on both sides of the slugs is such that all but one of the code slugs will remain locked by lugs 335 on either side of the combs. One of the slugs, corresponding to the analyzed code number, will be released by lugs 335. Thus, in the drawings, a slug having code number "226" is shown. Upon pins 261 sensing "226" perforated in a tag, the unit column pins opposite positions a and d (see Fig. 40) will advance, and the pin c of the tens and hundreds columns will also advance. The pins in advancing carry along the combs 332 associated therewith. Referring to Fig. 20 it is seen that of the four lower combs 332 which are associated with the unit column of four pins 261, as above explained, combs 332 a and d associated with unit column pins 261 a and d, each has a lug 335 on its right hand side (see also Fig. 18) directly above and adjacent a projection 346 on the right hand side of the code slug 336 marked "226". Also, of the tens and hundreds groups of combs 332, the combs 332c have lugs 335 on their right hand side directly above and adjacent projections 346 on the code slug. Thus when combs 332 a and d of the unit column advance one step with their actuating pins 261 which have moved through perforations in ticket g, the lugs 335 on the right hand side thereof release projections 346 on the same side of slug 336 corresponding to code number 226. In the tens and hundreds columns, combs 332c upon moving also release their lugs 335 from projections on the slug. Further, the movement of these combs does not position any of the lugs 335 on the left sides directly above and adjacent projections on the left side of the slug corresponding to number 226. Consequently, the latter is free to move upwardly as above explained, under the influence of spring 345 acting through arm 342 and member 339. The other slugs corresponding to other code numbers are however restrained from moving by the engagement of projections 346 thereof with lugs 335 of the combs.

The release of pins 261 and the selected code slug 336 is timed by shaft B. Referring to Figs. 1, 18, and 21, the pins 261 are prevented from advancing by the upper arm 347 of a lever 348 engaging enlarged portions 349 of the pins. The arm is urged away from the portions 349 by a spring 350 but cannot move due to a stud 351 on a link 352 blocking the lower arm of the lever 348. The link 352 as may be seen from Fig. 8, is provided at its outer end with a cam follower 353 urged into engagement with a cam 354 on shaft B by a spring 355. During the beginning of the revolution made by shaft B, the cam permits the spring to move the link 352 to the left (as viewed in Figs. 8 and 18). The stud 351 then withdraws from the lower arm of lever 348 thus permitting spring 350 to move arm 347 of lever away from projections 349 and release pins 261 for an analyzing operation. The link 352 at its left end is connected to a member 356 (Fig. 18) pivoted to the frame at its upper end. As the link 352 moves to the left, it rocks member 356 clockwise. The latter has therein an opening 357, one side of which is provided with notches 358 and 358', the latter being longer in one direction than the other. Initially, the free end of an arm 359 is seated in notch 358 but when member 356 is swung to the left by link 352, notch 358' moves opposite the end of arm 359. The latter is fast to shaft 343 which (Fig. 20) is provided with arms 360 which carry between them a rod 361. The latter is initially in contact with the lower edges of arms 362 integral with arms 342 and on the opposite side of shaft 343. The rod 361 thus normally prevents a spring 345 from actuating the associated lever comprised of arms 342 and 362. Shaft 343 normally tends due to the distribution of weight of the members carried thereby to rock clockwise and remove rod 361 from arms 362 but is prevented from doing so by the end of arm 359 being in contact with the bottom of notch 358. When member 356 moves notch 358' opposite the end of arm 359, the latter permits shaft 343 to rock an amount equal to the difference in lengths of notches 358 and 358'.

The rod 361 thereby moves away from the arms 362 and the spring 345 can now rock the arm 342 connected to that code slug 336 released by the combs 332 after analysis of the tag by pins 261 thereby raising the code slug and lowering the free end of the connected arm 362.

Referring to Fig. 19, the free ends of arms 362 are guided for vertical movement in slots 363 of a frame piece 364. One face of the plate carries a pair of guide studs 365 located in an elongated slot 366 of a link 367. The link is thus guided for slidable movement along the face of plate 364. The upper edge of the link 367 is provided with a pair of lugs 368 and 368' differentially spaced from the ends of arms 362. When any one of the arms 362 moves downwardly, it acts through engagement with a common rod 369 to rock pivoted arms 370 and 370' clockwise. The arm 370' extends beyond rod 370 and terminates in a free end which is guided for movement in a vertical slot 363' of the plate 364. A spring 372 urges the free end of the arm 370' upwardly to seat in a notch 373 cut in the left end of the member 367 (see Figs. 18, 19, and 22). The link 367 is thus latched unless one of the code slugs 336 and associated arm 362 are released. Spring 345 is stronger than spring 372 so that when the former moves one of the arms 362 downward, it will through rod 369 move the free end of arm 370' out of notch 373. The link 367 is thus unlatched and ready to move under the control of shaft B as will now be described. One end of link 367 is pivotally connected to a link 374 which in turn is pivoted to one end of a bell lever 375 (Fig. 8) the other end of which is pivoted to a link 376. The upper end of the latter has an elongated slot 377 in which is movable a rod 378 carried by an arm 379 fixed to a shaft 380. The latter has fast thereon arms 381 which at their lower ends are provided with a rod 382 engaging lugs 383 integral with printing control bars 65 and 65' corresponding to the fifteen columns at the left of the checks (Fig. 3). Springs 384 tend to rock the arms 381 counterclockwise thus sliding these bars to the right (as viewed in Fig. 8).

Initially, there are two conditions preventing such functioning of the springs. At the beginning of an operation of the B shaft, an integral extension 385 of the left hand arm 381 (as viewed in Fig. 1) is engaged by a rod 386 carried by the free end of an arm 387 fixed to shaft 181 which it will be remembered moved clockwise under control of cam 190 on shaft B (see Figs. 8 and 10). The rod 386 is thereby withdrawn from the extension 385 when the B shaft is operated. This alone, however, does not release arms 381. It requires the insertion of a tag g to complete the release of the arms. When a tag is inserted, link 245 is actuated to rock shaft 247 (see Fig. 23) counterclockwise. Referring to Fig. 5, shaft 247 when so rocked through linkage 388 and 388' rocks a latch lever 389 clockwise. The hooked upper end of the lever thereby withdraws from a projection 390 on the arm 379 fixed to the shaft 380. Thus, until a tag g is inserted, arms 381 rigid with shaft 380 are not released for movement even though shaft B has operated to withdraw rod 386 from extensions 385. When a tag is inserted, shaft B is set in operation, in a manner already explained. Simultaneously, arm 379 is unlatched by lever 389. When cam 190 on shaft B releases rod 386 from arms 381, rod 382 connecting the arms 381 and engaging lugs 383 on all the bars 65 and 65', is caused by the pull of spring 384 to actuate bars 65 and 65' to the rear (Figs. 8 and 31), there being nothing now to restrain such movements of the bars which therefore take place simultaneously. The rod 378 on arm 379 will first move the length of slot 377 in link 376 and the arms 381 and bars 65 and 65' will move a corresponding amount. This positions the bars past all the digit positions which such bars may take by actuation of arms 63 rigidly connected with arms 59 which are under control of the combs 72 and 73 sensing the operator's key and the respective date and check number members 165 and 174. As spring 384 continues to rock arms 381, rod 378 having reached the upper end of slot 377 now moves link 376 upwardly. This causes lever 375 to rock counterclockwise, thereby through link 374 moving link 367 to the right. The latter will be stopped, however, at differential points by engagement of either lug 368 or 368' with that one of the ten arms 362 (Figs. 18 and 19) which has been lowered by release of the corresponding code slug 336.

The link 367 is thereby caused to move to either of ten differential positions determined by the slug 336 which has been released upon analysis of the code perforations in tag g. It may be stated here that while the present machine is adapted to record only ten articles, provision may be made for recording a greater number of articles by providing a greater number of code slugs and associated parts so that the link 367 be stopped in any one of a number of positions more than ten.

When link 367 is arrested, the arms 381 (Figs. 8 and 31) and printing control bars 65 and 65' are likewise arrested. During this time, cam 106 on shaft B has withdrawn rod 129 from printing members 124, as previously described, thus permitting members 124 to be moved by springs 125 until stopped by engagement of ratchet 123 with the forward end of the bars. The members 124 are thus located according to the position of their control bars which in turn is determined by the released code slug 336. Since all of the bars 65 and 65' are moved, as above described, by common rod 382 connecting arms 381 and the latter in turn move until arm 379 (see Figs. 1 and 8) rigidly connected therewith, is stopped because of coaction of pin 378 with the upper end of slot 377 in link 376 which is differentially positioned under control of the code slugs 336, the bars will all take the same positions under control of the selected code slug. They will all take the same position because they are all moved by one and the same rod 382 which is movable differentially as determined solely by the position of code controlled link 376. Fig. 31 shows the position the bars 65 take when actuated by movement of common rod 382 to the rear, the final extent of this movement of the rod being controlled solely by the position of link 376. The members 124 will thus be moved differentially as a unit and not relative to each other as in the operation of controlling the members through the combs coacting with the operator's key 10. Thus, if the second letter type lug 126' from the right on one member 124 is in printing position, the second lug 126' from the right of the other members 124 will also be in printing position. The lugs 126' in the same row across the members 124 or parallel to the shaft 128 are designed to print the name of the article corresponding to the code slug selected by analyzing pins 261. Thus, if "226" is the code number of "dress", the pins 261 will sense the combination of perforations in tag g denoting "226" and the code slug corresponding thereto will be released, causing the positioning of members 124 so that a row of lugs 126' will be in position to print "dress".

In Figs. 38 and 39, a modification of the printing members 124 and their actuating members is shown. Link 374 instead of being connected to lever 375 is connected to a lever 391 which through link 392 is connected to a bell lever 393. A spring 394 tends to rock the bell lever clockwise but rod 129 controlled by shaft B initially prevents such action by engagement with toe 395' of the lower arm 395 of lever 393. There is only one bell lever 393 in the machine and it is provided with an arm 395 slotted for the greater portion of its length and having an upper fixed pin 396. A second pin 397 which is removable is located in a seat in the arm 395 and carried thereby, the pin 397 being disposed below pin 396. The left end of the pin 397 (as viewed in Fig. 38) is engaged by a spring blade 398 pivotally carried by the arm 395. The pin 397 may be removed by pivoting the blade 398 away from the end of the pin 397 and pulling the pin out of its seat in the arm 395. Extending parallel to the shaft 128 on which bell lever 393 is freely pivotally carried are a plurality of type carrying bars 399, each provided with an upstanding arm 400 at the left hand side (see Fig. 39), each arm 400 having an open slot 401 at the upper end and a hole 402 adjacent the lower end. Passing through all the slots 401 of bars 399 which are one behind the other, is the pin 396 and passing through all the holes 402 of bars 399 is the pin 397. These pins 396 and 397 lock all the bars 399 in place on arm 395. Each bar 399 has a set of individually slidable type lugs 403 which spell the name of an article. When it is desired to replace a bar 399 by one spelling a different article, the latch 398 is released from pin 397, the latter is moved lengthwise to remove it from the holes 397 of arms 400 of bars 399 which latter may then be slipped downwardly off pin 396 and the bars 399 are free to be replaced by other bars 399 having different type for spelling different names. In assembling such bars 399 on arm 395, they are moved with their slots 401 into engagement with fixed pin 396. Pin 397 is then reinserted in its seat in arm 395 and slipped through the holes 402 of bars 399. Latch 398 is then hooked over the head of pin 397 to retain it in place.

During the second rotation of shaft B, the rod 129 releases bell lever 393 permitting spring 394 to move the bail an amount determined by the movement of link 374 in turn controlled by the code slugs 336. The corresponding bar 399 is thereby positioned for printing. Hammers 135 are actuated as in the first modification.

In the second modification the digit type lugs are carried by members 124' separate from the bail 393 and in contact with the rear end of the arm 395. Members 124' are actuated as before, upon release of bar 129, in accordance with the positions of the printing control bars. However, unless arm 395 which is blocking members 124' is free to move clockwise with members 124' when the latter are actuated, the members 124' will be held stationary. Were link 374 to be latched at this time by latch 370' as in the first modification, lever 391, link 392, bail 393, and arm 395 would be held stationary and consequently members 124' would be prevented by engagement with arm 395 from moving under the controls described hereinbefore as operating during the first third of a revolution of shaft A and the first revolution of shaft B. In the first modification, the link 374 may remain locked by latch 370' because, as may be seen from Fig. 31, the digit type 126 on members 124 cover a span which corresponds to the movement of pin 378 on arm 379 from the lower end of slot 377 to the upper end of the slot. Therefore, in the first modification, the positioning of the digit type may be effected without necessitating any movement of link 376 and link 374 connected thereto. Link 374 may therefore remain stationary and be locked by latch 370' in the first modification. In the second modification, however, the link 374 must be free to move as above explained so that arm 395 connected thereto will not restrain movement of members 124'. In order that the digit carrying members 124' be capable of moving as during the first third of a revolution of shaft A, the latch 370' coacting with the notch 373 in bar 367 is therefore omitted in the second modification. The linkage 374, 391, 392 and the bail 393 will thus be free to move out of the way of the members 124'. Each of the latter will move under the influence of their springs until a ratchet tooth 123' engages the notch in the end of associated bar 65. This movement brings one of the digit type 126 over platen 127' and all the letter type 403 past the platen.

After tag g has controlled the printing members 124 for printing the name of the article and the price in line s of checks 55 and also caused the entry of the price in the accumulators 289 and 290, it must be ejected. This is effected through a cam 405 on shaft B which moves the follower 406 of a link 407 (see Fig. 9) against a spring 408 in a direction to cause clockwise rotation of shaft 409, (see Fig. 36). A pin 410 in an arm 411 fixed to shaft 409 coacts with an inclined surface 412 on one end of a lever 413 and rocks a stop 414 on the other end of the lever out of the path of the tag. At the same time a flat extension 415 on the end of the lever adjacent pin 410 engages the tag and pushes it into the grip of rolls 416, a series of which feed the tag towards a delivery magazine 417. As shaft 409 moves clockwise, through a link 418, it rocks shaft 419 and an arm 420 thereon counterclockwise. The upper free end of arm 420 is thus removed from the bottom of the stack of tags in magazine 417 and the last pair of rolls 416 feed the tag beneath the bottom of the stack. When the arm 420 is again raised, it moves the latter tag into contact with the bottom of the sack. The rolls 416 are constantly rotated from shaft M through gearing from shafts 228 and 230 (see Figs. 10, 11, and 12). The relative position of rolls 416 and rolls 226 may be understood from Figs. 10 and 12.

The rolls 416 are at right angles to rolls 226 and the tag is fed by rolls 416 sideways out of the chute 221 whereas the rolls 26 feed the tag longitudinally downward in the chute. When the tag is fed out of the chute 225, the pressure on arm 231 of lever 232 is relieved (see Fig. 23) and the spring 233 thereupon rocks the lever counterclockwise, withdrawing guard 234 from the chute slot permitting another tag to be inserted.

After a printing operation on checks 55 under control of tag g, the checks must be fed forward to the next line s of the check. This is done by a cam 425 on shaft B (see Fig. 24) which periodically engages follower roll 426 on a link 427 to move the link to the right (as viewed in Fig. 24). One end of the link is connected to a member 428 to which a spring 429 is connected to hold roller 426 in contact with cam 425. When link 427 is actuated, it rocks member 428 counterclockwise on its pivot 430 and through link 431 rocks lever 432 clockwise. The lower end of lever 432 carries a pawl 433 coacting with ratchet wheel 213 and the movement of the lever causes the pawl to rotate the ratchet wheel and thereby rotate feed wheel 209 to feed the checks 55 the distance between lines s. Thus, each time a tag is inserted in chute 225, printing and accumulating in accordance with the tag perforations is effected by the second revolution of shaft B, the sheets 55 are advanced a step and the tag is fed out.

In order to simplify the explanation, the feeding of the sheets 55 alone have been described. It has already been mentioned that positioned below the duplicate sheet is a tabulating card T with a carbon sheet between them. The position of the tabulating card at the beginning of the recording of the transaction is indicated by P' in Fig. 12. Referring to Figs. 24 and 34, the card T is held while in position P' in a horizontal slot 434 of a shuttle 435. The slot is closed on two adjacent sides at right angles to each other to abut the corresponding sides of the card and limit its movement into the slot.

Pivoted to the sides of the shuttle are a pair of grippers 436 (Fig. 34) which are urged by springs 437 into engagement with the underside of the card. The card is thus held fixedly in the slot 434. The shuttle carries a plurality of guide lugs 438 which have openings receiving rods 439. The rods are fixed between the sides 440 of a carriage 441 (Figs. 12 and 24) which is slidable on guide rods 442 at right angles to rods 439.

During the printing of the date, department, check, clerk, and transaction numbers in line r of the checks 55, the card remains in initial position P'. At this time, shaft A is on its initial third of a revolution and a cam 444 on shaft A coacting with a roller 445 on a pivotally suspended arm 446 does not move the latter and the card therefore is stationary. The lower end of the arm is pivoted to a link 447 (see Figs. 5 and 12) which is connected to a spring 448 urging the link in a direction for roller 445 to maintain contact with cam 444. The link 447 is pivoted to an arm 449 rigid on a pivot 450 which has fast therewith a link 451 having a longitudinal slot 452 in which is disposed a pin 453 carried by the card shuttle 435. As the shaft A approaches the end of its initial third of a revolution, the roller 446 moves from cam portion 454 of cam 444 to portion 455. Link 447 thereupon moves to the left and swings arm 451 downward (as viewed in Fig. 12). The shuttle 435 is thereby moved on rods 439 to its lowermost position. Portion 455 of cam 444 is arcuate so that for the remainder of the first 120° movement of shaft A, the link 447 is permitted to dwell and shuttle 435 does not move on rods 439. While the shuttle is being moved downward as described, the arcuate portion 456 of a cam 457 on shaft A (see Fig. 24) permits the roller 458 on an arm 459 to dwell. When link 447 begins to dwell, the bump 460 on cam 457 begins to move the arm 459 clockwise, thereby through link 461 moving arm 462 counterclockwise against the resistance of a spring 463.

The lower end of arm 462 has a pin and slot connection with one end of an escapement member 464, the other end of which is connected to the carriage 441 carrying the card shuttle 435. The counterclockwise movement of arm 462 (as viewed in Fig. 24) through member 464 moves carriage 441 to the right, the carriage sliding on rods 442 (see Fig. 12) to cause the card to take the position marked P². As the high point of the cam bump 460 leaves roller 459 at the close of the initial 120° movement of shaft A, the spring 463 tends to move the roller 458 inwardly and return the link 462 member 464, and carriage 441 to the left. This is prevented by the pawl 465 engaging an escapement tooth of member 464 blocking return movement of said member. The card is thus positioned at P² at the end of the first 120° of A's revolution and until a tag $g$ is inserted. In this position, the row of printing lugs 126' on the separate members 124 are adapted to print in the bottom line $s$ of the card shown occupied by "1 dress", etc. in Fig. 2. It will be remembered that when a tag $g$ is inserted, the shaft B is caused to make one revolution to print the name of the article and the price thereof in a line $s$ of checks 55. Since there is a carbon sheet between the bottom check and the tabulating card, the same information will be printed in line $s$ of the card. It has been explained that as the shaft B approached the end of its revolution, a cam 425 thereon coacted with a link 427 to swing a member 428 counterclockwise on its pivot 430 and through connections therefrom to rotate the feed wheels 209 for advancing the sheets 55 to the next line $s$ thereof. At the same time as this feeding movement of the sheets is effected by the means including member 428, a pin 466 carried by said member swings arms 467 and 468 connected by spring 468' counterclockwise on pivot 430. Arm 467 is rigid with pawl 465 and arm 468 is rigid with pawl 469. As the arms 467 and 468 swing counterclockwise, the pawl 465 leaves the escapement teeth on member 464 and the latter is moved by spring 463 through arm 462 until stopped by engagement of pawl 469 which has been moved upward.

When cam 425 releases link 427, the member 428 swings clockwise, releasing pawl 469 from the rack and moving pawl 465 in engagement therewith, in the meanwhile permitting movement of the rack. The combined movement of the rack during the oscillation of member 428 is such that the next line of the card for receiving the article name printing is positioned in line with the type lugs. Thus each time a tag is inserted, the shaft B is released for a revolution at the close of which the card is advanced one step equal to the distance between adjacent lines for receiving the article name printing.

*Total taking*

The means for taking the total of the price of the articles represented by the tags $g$ which have been inserted will now be described. Referring to Fig. 5, a pair of finger keys 475 and 476 are provided to be operated, respectively, for sub total and grand total operations. When either key is pressed down, it is latched by one of the two similar hooks 477 on a member 478 urged into latching position by a spring 479. Member 478 is pivoted to a link 480 coacting with a cam 481 on shaft A, the function of the cam being to unlatch the keys at the end of the totaling operations, as will be presently described.

To initiate the total or grand total operation, the operator depresses key 475 or 476 against the resistance of springs 482 and the key is latched by hook 477. The lower end of key 475 as it moves down engages a pin 483 on one arm of a bell lever 484 which has a pin and slot connection with link 245 and rocks it clockwise on its shaft 485. The key 476 similarly engages a pin 486 on a lever 487 which has a pin and slot connection with link 245. The pin and slot connection between levers 486 and 487 and link 245 permits actuation of the link by either lever without affecting the other lever.

When either key is depressed, the lever associated therewith moves link 245 to the left rocking shaft 247 and arm 388' counterclockwise (Fig. 5). Arm 389, through link 388 would thereupon release arm 379 permitting the spring 384 (Figs. 8 and 31) to move arms 381 and rod 382 and the printing control bars 65 operated thereby to the extent permitted by slot 377 in link 376. This would cause positioning of the printing members 124 to carry all the digit types thereof past the printing line as in the operation of printing from code perforations on the tag $g$. To prevent this, link 388 is made in two parts, the upper part 388a being slidable on the lower part and movable therewith through a connecting spring 488. The part 388a at its lower end has a lug 489. The latter may be engaged by the free end of an arm 490 to prevent downward movement of part 388a, while the spring 488 permits the lower part of link 388 to move down when arm 388' rocks counterclockwise. The arm 490 is actuated to position for engaging lug 488 by a link 491 operated whenever a total or grand total key is operated. Thus, the lever 484 operated by the total key 475 has at its lower end a pin and slot connection with link 491 (Fig. 5) so that upon movement of link 245 to the left, as described, link 491 will move similarly and cause arm 490 to latch link part 388a against downward movement. The arm 379 is thereby prevented from moving and the operation of the printing means is not interfered with.

Shaft 247, it will be remembered is rocked counterclockwise each time a tag is inserted. Referring to Fig. 27, when so rocked, shaft 247 will move an arm 492 thereon from the full to the dotted line position in said figure. The pin 493 on the free end of arm 492 when in dotted position does not engage a member 494 and has no effect thereon. When the total or grand total key is depressed, the shaft 247 will be rocked counterclockwise to a greater extent than when operated by the tag. The pin 493 will therefore engage member 494 and swing it on its pivot pin 495 carried by arm 51' fast to shaft 496 on which is fixed arm 51 previously described as latching the arm 45 and pawl 46 at the end of one-third of a revolution of shaft A.

The arm 494 is connected by a spring 497 to a bell lever 498 which has a hook 499 coacting with a lug 500 on lever 39 fast to shaft 38, as hereinbefore described. Cam 34 on the main shaft periodically rocks arm 36 fast to shaft 38 and thereby periodically rocks lever 39 counterclockwise. When the pin 493 on arm 492 moves arm 494 to the left, the latter draws after it the lever 498, engaging hook 499 under lug 500 on lever 39. Thus, the latter when periodically moved counterclockwise, actuates lever 498 bodily downward and through its pivot pin 495 rocks arm 51', shaft 496 and arm 51. The latter will thereupon unlatch arm 45 carrying pawl 46 which engages ratchet wheel 49 and sets shaft A rotating for the remaining two thirds of its revolution at the end of which the motor 25 is stopped leaving arm 42 blocking the arm 45 and pawl 46 thereby positioning the shaft A properly for the next recording operation.

Shaft B is also released for a final revolution, which may be the third or fourth or fifth, etc., depending on the number of tags g which have been inserted in the machine while the operator's key 10 remains in position in a slot 11. Thus, in the example shown in Figs. 2 and 3, three tags g have been introduced in the machine by the clerk during the operation of recording a single customer's transaction. Accordingly, after the third tag g has been introduced and operations performed under its control, there have been four revolutions of shaft B, the first, initiated by shaft A, the second initiated by tag g, denoting "1 dress", the third by tag g, denoting "1 overcoat", and the fourth by tag g, denoting "1 hat". When the sub-total key is depressed, in the example given, it will result in a fifth revolution of shaft B by operation of a total key. The shaft 247 (see Fig. 23) when rocked by the total key, moves arm 248, which through member 93 causes hook 98 to engage lug 99 on the oscillating member 36. Arm 95 is thereby released from the pawl 102 and arm 101, thus clutching shaft B to gear 31 for one revolution.

Lines t (see Figs. 2 and 3) of the card T and the checks 55 are adapted to receive the data printed on a total operation. The card and checks must therefore be moved from the last line in which the article named and price has been printed to the line t.

When the sub total key 475 is depressed, lever 484 (see Fig. 5) is rocked counterclockwise. The lever through linkage 502 rocks shaft 503 counterclockwise. Fixed on shaft 503 is an arm 504 (see Fig. 24) which through link 505 rocks arm 506 rigid with pawl 465. When shaft 503 is rocked counterclockwise, it causes pawl 465 to withdraw from escapement member 464. The spring 463 thereupon through link 462 moves the member 464 to the extreme left, actuating carriage 441 so that the card takes the position P³ (Fig. 12) in which lines t are below type 126.

When shaft A begins its second third of a revolution cam 220 moves link 218 to the left and causes rack 217 to rotate gears 212 and 211 to actuate feed rolls 209 and thereby feed the checks 55 to locate lines t thereof in printing position.

On a total operation, the bars 56, 56', 65, and 65' function as in the first printing in line r of the checks to print in lines t, the date, department, clerk, check number, and kind of transaction.

The total price printing is controlled from the accumulators. When cam 190 on shaft B causes shaft 188 to rock clockwise, arms 180 tend to move the accumulator operating members 270 upwardly. The latter must, however, be released by the analyzing pins 260. As shaft B rotates, cam 190 through shaft 188 and arm 293, releases arm 265 from studs 264 of the pins. This would permit all the pins to move forward. However, since the members 270 will not in any case move further than the distance equivalent to a nine, the pins 260 c and d which do not move when a "9" is sensed, are held back by arm 268 see Fig. 26 which has a pair of teeth 510 and 511, engaged respectively by the hooked arms 512 and 513 on shafts 503 and 514 whenever either the total or grand total key is operated. Shaft 503 is operated when key 475 is depressed through lever 484 and link 502, as already explained. Similarly, the key 476 when operated through link 515 connected to lever 487 rocks arm 516 fast to shaft 514 (Fig. 5). Thus, when either key is operated, the hooks 512 or 513 will engage teeth 510 or 511 respectively of arm 268 and prevent its movement. The pins 260 c and d will thus be held back when a total operation is effected and members 270 can move the limit permitted by analysis of a "nine" combination.

In order that the members 270 be positioned in accordance with the final reading on the price accumulators, the pinions on the latter must be meshed with the racks 288 on members 270 before the latter move upward. Referring to Figs. 29 and 30, the shafts 503 and 514, (Figs. 5 and 24) previously mentioned, have arms 517 and 518 respectively fixed thereon. The upper end of arms 517 and 518 have pin and slot connections with links 519 and 520, respectively.

When the sub total key 475 is depressed, the shaft 503 is rocked counterclockwise (Fig. 51) moving link 519 to the left and rocking lever 521 connected thereto counterclockwise on its pivot pin 522. The lower end of lever 521 has a pin 523 which engages the edge of arm 303, previously described as operated from cam 300 of the B shaft, and moves the slot 306' at the lower end of the arm out of cooperation with pin 307 of arm 308, on shaft 309. The latter moves the total accumulator pinion 289 into mesh with the members 270 when shaft B is operated under tag control. When link 519 moves to the left, a tab 524 thereon engages a lug 525 on link 520 and moves the latter link to the left without affecting arm 518, this being permitted by the pin and slot connection. The movement of link 520 rocks an arm 526 counterclockwise on pivot 522. The outer end of arm 526 has a pin 527 which when the arm 526 is actuated moves the arm 303' to the left, removing the upper edge thereof from under pin 304. The arm 303' draws after it by spring 528 the arm 529 carried by a pivot 530 on the end of an arm 531 adapted to coact with a cam 532 on shaft B. As indicated in Fig. 51, the movement of pin 527 under the control of lug 524 is not sufficient to place the upper edge of arm 529 under pin 304 of arm 305 on shaft 306. The latter will thus not be operated when cam 532 raises arm 531 and its connected arm 529 and the grand total accumulators will not be meshed with members 270 when the total key is operated.

Arm 303, however, is moved sufficiently by pin 523 on arm 521 to draw after it through spring 533 the arm 534 on pin 530 and position it with a notch 535 at its lower end over pin 307 of arm 306 on shaft 309. The position of the parts at this stage of the operation is shown in Fig. 51. When cam 532 raises arm 531, the arm 534 will thus through notch 535 and pin 307 actuate arm 308 of shaft 309 and effect meshing of the total accumulator pinions 289 with the members 270. The cam 532 acts at the beginning of a revolution of B so that the accumulators will be meshed with the members 270 while the latter are rising.

When the grand total key 476 is depressed, the link 520 will be actuated its full extent and through arm 526 and pin 527 remove the edge of arm 303' from under pin 304 and position the edge of arm 529 under said pin. Thus when arm 531 is raised by cam 532, it will effect actuation of shaft 306 meshing the grand total accumulators with the members 270.

While link 520 moves to the left its full extent, through a lug 536 thereon engaging tab 524 on link 519, it moves the latter sufficiently to cause lever 521 through pin 523 to remove the notch 306' of arm 303 from pin 307 and not enough to move notch 535 of arm 534 over the latter pin. The sub total accumulators will thus not be meshed when the grand total key is operated.

Assume that the sub total key 475 has been operated so that the sub total accumlator pinions 289 are in mesh with the racks 288. When the latter rise under the pull of arms 180, they will rotate the accumulators in a direction reverse to that during entry. The accumulator will rotate until the back of one of the transfer lugs 317 engages the top of the arm 318 as shown in Fig. 26. The accumulators will thus be stopped in zero position and in turn stop the members 270 in differential positions determined by the amount of rotation and the reading of the associated accumulators.

When rod 86 is released from the bars 56 in line with the members 270, they will take positions corresponding to those of members 270 and in turn position bars 65 and members 124 for printing the total price of the articles in lines t of the checks 55 and the tabulating card. The bars 56' controlled from the operator's key which remains in the machine are still in the same position as during the printing in lines r of the checks. The bars 65' associated with bars 56' are free to be moved by the arms 381 during the tag controlled operations. When the arms 381 are restored by the rod 386 they draw bars 65' after them through springs 404 (Fig. 31) connecting a rod 404' joining arms 381 to the bars 65' but the latter are stopped by associated fingers 63 in positions determined by the bars 56'. Thus, when the total operation is effected, the bars 65' are in position for controlling printing of the number of the clerk and the kind of transaction. The date and department bars 56 and associated bars 65 are positioned and restored every B shaft cycle under control of cam 106 for printing the date and department. The check bars 56 and 65 are moved every B shaft cycle but during the tag controlled cycles, the bars 65 are moved further to the rear by the arms 381, as already explained, in order to print article names. During the total taking operation, the check bars are however positioned for printing the check number, arms 381 being latched by hook 389 there being no tag in the holder 221. To prevent accidental insertion of a tag during the total operation, the cam 222 (Fig. 23) for the final two-thirds revolution of shaft A holds the arm 224 in the slot of the holder, blocking insertion of a card.

The printing of the date, department, clerk's number, kind of transaction, and check number together with the total price of the articles is thus printed in lines t of the checks and the tabulating card. All this occurs during the second third of a revolution of shaft A and in the one revolution of shaft B initiated upon depression of the total key.

During the last third of a revolution of shaft A, the machine operates to print in line v of the checks and to punch the bottom portion of the tabulating card with the data printed in lines t of the card and the checks, namely, the date, department, clerk's number, kind of sale, check number, and total price of the article sold. The punch marks corresponding to the digit of an item are located in the same vertical column as the digit. The same combinational code shown in Fig. 40 and described in connection with the tag analysis is used in punching the card.

Since a second printing of the same data as in line t of the checks is to take place and also the data is to be punched in the cards, it is necessary that the accumulators which controlled the setting up of the total price controls bars 56 and 65 retain the reading which they had at the beginning of the total operation. During the first part of this operation, the accumulators were meshed with members 270 and when the latter moved up were rotated until the transfer lugs stopped them in zero position. Were the accumulators to be demeshed then, they would have no reading and so could not again set up the punch control bars 56 and the printing control bars 65 to control the total price punching and printing. In order that the accumulators retain their readings, they are held in mesh during the return of the members 270.

Referring to Fig. 47 the shaft A has a cam 540 which coacts with an arm 541 pivoted at 542. The outer end of the arm has two vertically disposed branches 543 and 544. The end of each branch is formed with a hook 545 the one on branch 543 coacting with a lug 546 on the plate 314' of grand total accumulator and the hook 545 of branch 544 coacting with a lug 546 on the plate 314' of the sub total accumulator. When the shaft A is rotating for its first 120°, the cam 540 raises arm 541 and the hooks 545 out of the path of lugs 546. Thus, during the revolutions of shaft B under control of tags g after the accumulators are brought into mesh with members 270, they may be restored without lug 546 catching on hook 545.

When the shaft A begins its motion under control of either total key 475 or 476, the shaft B also rotates and meshes the accumulators with the members 270. After this has occurred, the cam 540 on shaft A permits hooks 545 to drop over lugs 546 thus latching the accumulators in meshed position. When the members 270 are restored under control of cam 190 on shaft B, they rotate the accumulators as during an entering operation and restore the same reading to the accumulators which they had at the beginning of the total operation. Thus, if one accumulator wheel reads "6", it would when its cooperating member 270 moved up, stop the latter due to the transfer lug 317 abutting member 318 after said member had moved up six steps. When the member 270 was positively restored to original position, the accumulator being in mesh therewith through being latched by hook 545, will likewise be restored to original position and thus read "6" again. During the greater part of the last third of a revolution of shaft A, the accumulators are kept in mesh with members 270. During this last third of a revolution of shaft A, the shaft B is set in operation for another revolution under control of cam 90' on shaft A which functions in the same manner and to the same effect as cam 90 already described, in clutching shaft B to its gear for one revolution. During the revolution of shaft B initiated by cam 90', the members 270 will again be drawn upward by the spring-pressed arms 180 and will again be positioned in accordance with the reading of the accumulator. The latter when stopping the members 270 read zero. Before the members 270 are restored by cam 190 on shaft B, the cam 540 on shaft A raises the hooks 545 out of the way of lugs 546 so that the spring 316 (Fig. 10) is now free to demesh the accumulators from the members 270.

After the total printing in line $t$ of the card has been effected, the shaft A moves the card to punching position P4 (Fig. 12) where it is beneath the gang punches 550 occurring in columns of four. During the second third of a revolution of shaft A, portion 551 (Fig. 24) of cam 457 coacts with roller 458 on arm 459 to draw link 461 to the rear and rock arm 462 counterclockwise as viewed in Fig. 24. The rack arm 464 is thereby drawn to the extreme right and moves the carriage 441 to the extreme right end of guide rods 442 (see Fig. 12). After this has occurred, the portion 552 (Fig. 5) on cam 444 of shaft A draws arm 446 and link 447 to the right (as viewed in Fig. 5). The arms 449 and 451 are thereby rocked counterclockwise (Fig. 12) and the card shuttle 435 moved to the extreme upper position on rods 439 of the carriage 441. As arm 451 moves the shuttle 435 to its extreme upper position (as viewed in Fig. 12) the advance end of the card moves between die plates 554 and 555 (Figs. 10, 42, and 43) which are perforated in alinement with the punches 550. The card is then released from the bite of grippers 436 in the following manner. Referring to Fig. 34, the grippers are pivoted at their lower ends to a member 556. As the shuttle 435 reaches the end of its movement to the left (as viewed in Fig. 34) the head of a stationary adjustable, screw 557 contacts the end of the member 556 and moves it to the right, thus rocking the grippers counterclockwise and releasing them from the card. The member 556 is latched in actuated position by a lug 558 thereon being engaged by the end of an arm 559 of a lever having its other arm 560 acted on by a spring 561 tending to move the lever to latching position.

Figure 7:
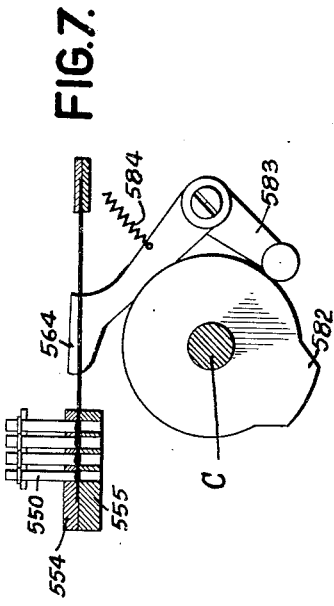
Fig. 7 is a detail of a card abutment and its control.

When released by the grippers, the card is seized by upper and lower rolls 562 (Figs. 11, 12, 42, and 43) the lower rolls being constantly rotated on a shaft 563 by gearing from shaft 228 (see Fig. 11). The rolls are unable to move the card further than position P4 because the advance edge thereof is stopped by contact with an abutment 564 (see Fig. 7). The card is now located in punching position P4. The upper rolls are freely movable upwardly as will be later explained.

The checks 55 have been fed to lines $t$ and $v$ successively during the total operation by cam 220 on shaft A coacting with link 218 to advance the feed wheels 209 in the manner previously described. When the cam 90' on shaft A starts the shaft B rotating for the second time during totaling, the checks 55 are in position to receive an imprint in line $v$ and the card is in punching position P4. The cam 190 on shaft B functions to raise the price controlled members 270 and the check number members 174. The members 270 rise till stopped by the accumulators in positions corresponding to the accumulator readings, the accumulators being held in mesh as explained by hooks 545. The check members rise till stopped by lugs 173 on bar 170. The cam 106 on shaft B then withdraws rod 86 from lugs 85 on the bars 56 in line with the price, date, department and check control members 270, 165, and 174, respectively, and the bars take positions determined by these members. Correspondingly, the bars 65 connected with these bars 56 move to control positions. Cam 106 then withdraws rod 129 from the members 124, permitting the latter to move the type to positions controlled by bars 65. The members 124 for printing the operator's number and kind of sale are also in printing positions, bars 56' controlled by this data having remained set under control of the manually set date and department members and the operator's key 10, as hereinbefore explained. Operation of the hammers 135 takes place under control of cam 106 and line $v$ of the checks is printed. Punch selecting members 121 which have been restrained by a rod 566 (Fig. 32) from moving under influence of springs 567 during the printing of the data in lines $r$ of the checks and $s$ and $t$ of the checks and card T are released during the last third of a revolution of shaft A to cause punching. Rod 566 is carried by arms 568 fast to shaft 569 on which members 121 are freely journaled. Fixed to shaft 569 is an arm 570 (Fig. 10) which through link 571 is connected to a bell lever 572 coacting with cam 573 on shaft C geared one to one with shaft A (see Fig. 49).

The cam acts during the last third of a revolution of shaft A and of shaft C to permit lever 572 to rock counterclockwise (as viewed in Fig. 10). Members 121 now move under the force of springs 567 together with rod 566 until the racks 120 are stopped by the notched ends of the associated bars 56. The lugs 122 of the members are thus positioned over a combination of the four punches 550 in a single column in accordance with the data represented by the positions of the bars 56 and the control means of the latter. The card is between die plates 554 and 555 and the punching is effected by moving these plates and hence the card upwardly. This is effected by a cam 575 on shaft C (see Fig. 43) which after the members 121 have moved to positions controlled by bars 56 and 56' rocks an arm 576 counterclockwise (as viewed in Fig. 10). The free end of this arm is pivoted to the frame 577 carrying the die plates 554 and 555 so that when the arm rocks upwardly the frame 577 is slid upwardly in its guide frame 578 (see Fig. 43). The punches 550 are moved upward by the surface of the card until the heads of the punches contact one or more of the lugs 122 on the members 121. The card continues to move upward so that the punches which have been arrested by lugs 122 perforate the card. The upper rolls 562 are journaled in slots 579 in the upper die frame rigid with die 454, as seen in Fig. 43, and are pressed downward by springs 580. Hence, when the card is moved upward, it will carry the upper rolls 562 with it against the force of springs 580.

After punching, the die plates are lowered by cam 575 and the rolls 562 are in readiness to advance the card to the card delivery magazine 581. To permit this, the abutment 564 at this time is lowered out of the path of the card by a cam 582 (Fig. 7) on shaft C acting to rock the bail 583 having the abutment 564 at its end clockwise against a spring 584. The rolls advance the card to rollers 585 which move it to the magazine 581. Hooks 586 (Fig. 37) raise the stack of cards in the magazine and permit the last card to be fed in under the raised stack. The hooks then move outwardly beyond the sides of the frame plate 196 which forms the bottom of the magazine and then underneath the last card through slots 588 in the bottom.

The desired compound motion of the hooks is effected by a gear 589 on shaft C which meshes with gears 590 and 591, driving, respectively, gears 592 and 593. The hooks are on arms 595 which are provided with slots 596 coacting with crank pins 597 on the gears 591 and 592. The other gears 590 and 593 have crank pins directly connected to arms 595. This mechanism produces a compound motion of arms 595 moving the hooks successively upward through slots 588 of the bottom to raise the card stack, then outwardly and downwardly, then inwardly in line with slots 588.

After the printing operation in line v of the checks and while the punched card is being ejected, a new card is moved from the supply magazine into initial position P' and the check webs are moved into position for receiving an imprint in the next line r.

The feeding of a new card will first be described. As the shaft C together with shaft A is completing its final third of a revolution, a cam 602 on shaft C (Fig. 12) rocks lever 603 counterclockwise against spring 604 and moves a card picker 605 in a direction to advance a card from the supply magazine 601 to the upper and lower feed rolls 606, the lower rolls being on a shaft 607 geared to constantly rotating shaft 563 (see Figs. 11 and 12). While the card is thus being fed to position P', the cam 457 on shaft A begins to move back to the position shown in Fig. 24, thus causing arm 459, link 461 and rack 464 to move to the left and move the carriage 441 towards the initial position. As this movement is completed, the cam 444 moves link 447 to the right and causes the shuttle 435 to return to initial position. The card is then being fed by the picker 605 and rolls 606 into the slot 434 of the shuttle. When the shuttle approaches the end of its return movement, an adjustable screw 608 (Fig. 34) engages the arm 560 and unlatches arm 559 from arm 556. The springs 437 thereupon move the grippers 436 into engagement with the card which is now in position P'.

At the same time as a new card is being fed into position, check feed rolls 209 are rotated through cam 220 on shaft A to move the check webs so that a new line r is in printing position. Each time a total is taken and a new check and card fed forward, the check number control cam 172 is advanced one step. Referring to Fig. 32, the snail cams 172 associated with each check control bar 170 are freely rotatable on a shaft 610 carrying arm 611 (Figs. 1 and 32) to which are pivoted on rod 612 pawls 613 each adapted to engage ratchet wheels 614, each fixed to a snail cam. The pawls 613 are urged towards arm 611 by springs 615. Also fixed to shaft 610 is an arm 616 having at its free end a pin 617 in engagement with an arm 618 fixed to shaft 569 which controls the release of the punch member 121. When the shaft 569 turns counterclockwise to release member 121 in preparation for a punching operation, the arm 618 moves away from pin 617 permitting movement of arms 611 to the rear, pawls 613 following it. A spring 617' (Fig. 8) is connected to the arm 617 to force it to follow arm 618. The unit pawl slides over the periphery of the unit ratchet wheel into contact with the next tooth thereof. The ratchet wheels are prevented from following the movement of arm 611 by detents 619. When the shaft 569 is restored, arm 618 moves back and engages rod 617 on arm 616 to return it to initial position. In so doing, the arms 611 are moved counterclockwise and unit pawl 613 moves the unit ratchet wheel one step. A disk 620 (Fig. 3) is fixed to each cam 172 except the highest order cam. The disk has a single notch 621 into which a pawl 613 may be moved to engage the associated ratchet wheel 614. Thus, when the unit wheel passes from a "9" to a "0" position, the disk 620 moving therewith is located in line with the nose of pawl 613 of the tens wheel permitting spring 615 to draw the tens pawl into engagement with the teeth of its cooperating wheel to advance it one step. A transfer is effected in this manner. When the notch 621 is not in line with the nose of a pawl 613, the latter will ride on the periphery of the disk and be unable to actuate its coacting wheel.

When a grand total operation is effected, it is not desirable to record a check number. Accordingly, the shaft 514 actuated upon depression of the grand total key is connected through linkage 622 (Fig. 5) with a shaft 623 carrying an arm 624 (Fig. 10) the upper end of which is adapted to engage alined lugs 625 on the bars 170. When the grand total key is depressed, the shaft 623 and arm 624 are rocked clockwise, moving the bars 170 to their rearmost positions. Hence, when the arms 180 raise the members 174 under control of cam 190 on shaft B, said members will not be stopped by lugs 173 which are now out of the way and the corresponding bars 56 will be moved to their furthest rear position. The punch members 121 will when released move all the lugs 122 past the punches 550 so that no punching can result. The corresponding bars 65 will be moved as far as permitted by slot 371 (Fig. 31) in which position, they control members 124 to position themselves with the space between type 126 and 126' in line with the nose of hammers 135. Thus the latter fails to operate any type and no printing results.

When the total taking operations are complete, a cam 626 on shaft C actuates a link 627 connected to latch 16 to the right (as viewed in Figs. 10 and 44). The latch thereupon withdraws from the hole 19 in the key 10 leaving the spring 13 free to move the arm 12 counterclockwise (Fig. 13) and thus eject the key 10 from its slot. The movement of the arm 12 also opens contacts 22 and the motor circuit is thus broken, causing the machine to stop.

Provision is made for replacing any one of the code slugs 336. Referring to Figs. 20 to 22, the rear ends of combs 332 are engaged with beveled cam edges 628 formed on a depressible finger key 629 (see also Fig. 1) guided in frame 333. A bell lever 630 is pivoted at one end to the key 629. The other end of the lever 630 carries a rod 631 which when the key 629 is depressed abuts a lug 632 on each member 339 to move the member to the rear and remove the pin 338 thereof from the slot 337 in the associated code slug 336.

At the same time, depression of key 629, through cams 628, forces all the combs 332 to move forward on pins 261 against the resistance of springs 2612. This movement of the combs is just sufficient to remove the lower lugs 335 (as seen in Fig. 18) from adjacent projections 346 of the code slugs without moving the upper lugs 335 over adjacent projections 346. Consequently, all of the code slugs are free to be removed and replaced. When the key 629 is released, springs 2610 force the combs against the tabs 2610 formed on the rear end of pins 261, thereby lifting the key 629 to its initial position.

The housing of the machine comprises a sheet metal casing 640 integral with the walls of magazines 417 and 581 as shown in Figs. 45 and 48. The housing completely encloses and renders inaccessible the printing punching, feeding, and other mechanisms. In front of the printing members 124, the housing comprises a plate 641 (see Figs. 8 and 31) formed with sides 642 (Fig. 31) rigidly fixed to the aft 128. Hence when the latter moves forward to release the printing members, the plate 641 will also move and permit the printing member 124 to move forward. If plate 641 were stationary, the printing member would be stopped by contact therewith as may be understood from Fig. 8.

In order to prevent unauthorized tampering with the records, the magazine 581 containing the printed and punched tabulating cards is provided with a cover 643 locked to the sides of the magazine by a lock 644. Similarly, magazine 417 which receives the tags $g$ after the records have been made therefrom, is provided with a hinged cover 645 closed by a lock 646. A cover 647 is also provided for slugs 336 and key 629, the cover being locked to the housing 640 by a lock 648. The only ordinarily accessible portions of the machine are the key slots 11, the date and department control bars 165 engageable through opening 168, the tag holder 221, the blank card magazine 601, total and grand total keys 475 and 476, and the checks 55.

The operation of the machine will now be briefly summarized:

Assume that clerk No. 1925 sells for cash to one customer a dress, an overcoat, and a hat, costing $39.50, $40.00, and $10.00 respectively. The clerk detaches the tags $g$ from each article and inserts his key 10 in the slot 11 marked for cash sales. Arm 12 is thereby actuated to start the motor 25 and to cause latch 16 to lock the key in the slot. A cam 34 on a motor driven shaft M then sets a cam shaft A in operation for one-third of a revolution. A cam 83 on shaft A releases combs 72 and 73 to engage the key 10 and position punch control bars 56' in accordance with the clerk's number and kind of sale. Correspondingly, printing control bars 65' are moved by bars 56' to control printing members 124.

Cam 90 on shaft A starts cam shaft B rotating for one revolution. A cam 190 on shaft B then raises members 174 into contact with lugs 173 on check number control bars 170. A rod 86 is then released by a cam 106 on shaft B from lugs 85 of the punch control bars 56 in line with the check members 174 and in line with manually set department and date members 165. These bars 56 as well as their associated printing control bars 65 are then moved by springs 116 into positions determined by the location of bars 165 and 174. The punch members 121 controlled by bars 56 and 56' are releasable under control of a cam 573 on a shaft C, geared one to one with shaft A. This cam is not operative while shaft A is making its first third of a revolution. The printing members 124, however, are under control of cam 106 on shaft B and accordingly are released at this time and position type 126 over a platen 127 in accordance with the positions of bars 65. The hammer 135 then operates also under control of cam 106, and the printing of all of line $r$ of checks 55 (Fig. 3) is effected. Checks 55 are then advanced under control of cam 220 on shaft A to move the first line $s$ thereof into printing position. At the same time, a record card T is moved by cams 444 and 457 to locate its first line $s$ in printing position. There are original and duplicate checks 55 separated by a carbon sheet and beneath the duplicate sheet is another carbon sheet and then the tabulating card. When the first third of a revolution of shaft A is completed, shaft B has completed an entire revolution and bars 56 and 65 associated with the check, date, and department columns and check members 174 are restored to initial position by shaft B. Bars 56' and 65' being under control of shaft A, however, are not now restored. When shaft A approached the end of its initial third of a revolution, a cam 222 thereon (Fig. 23) withdrew a shutter 224 from the slot of a tag holder 221. The operator now inserts a tag $g$ taken from any one of the articles sold in the holder.

Assume he first inserts the tag taken from the dress. Continuously moving feed rolls 226 feed the tag downward into control position in the holder. A shutter 234 is thereupon moved across the slot of the holder, preventing insertion of another tag $g$ before the first one has been fed out of the holder. At the same time, the insertion of the tag operates mechanism to release shaft B alone for a complete revolution. Under control of cam 190 of shaft B, analyzing pins 260 are released to sense perforations in the tag representing the price of the article, in this case $39.50 for a dress. The pins thereupon differentially release members 270 which are raised also under control of cam 190 till stopped by the pins. In line with the members 270 are punch control bars 56 and under control of cam 106 on shaft B, these bars and associated bars 65 are moved to positions determined by the positions of members 270. The punch control members 121 are not released but cam 106 on shaft B releases members 124 which position type lugs 126 in accordance with the positions of bars 65. While this is going on, pins 261 are released by cam 354 on shaft B to analyze code perforations on tag $g$, in this case representing "226" which is the code number for "dress". The analysis of the code perforations results in release of one of ten arms 362 to position it in the path of a lug 368 or 368' on a member 367 which is connected to link 376 (Fig. 8) having a slot 377 therein. Seated in the slot is a rod 378 on an arm 379 which is normally latched but when a tag is inserted released to move under the pull of a spring 384 (Fig. 8). When so released, an arm 381 moving with arm 379 moves as far as permitted by the slot 377. The arm 381 thus simultaneously actuates bars 65' and those bars 65 associated with the date, department, and check numbers to a position such that when members 124 are released by shaft B, the members will move all of digit type lugs 126 past the printing position. When the member 367 is released by an arm 362 under control of the code perforations, it moves until stopped by the released arm 362.

The member 381 moves correspondingly and the bars 65 and 65' actuated thereby all move further to the right and to the same position. When associated members 124 are released, a row of letter type 126' is located in printing position. This row is designed to print "dress". The members 124 associated with the price controlled members 270 are also in printing position. Printing is then effected and in the first line $s$ of the checks and the card T are printed "1 dress" and its price "$39.50". During the restoration of members 270, sub total and grand total accumulators 289 and 290, respectively, are meshed therewith so that the price read by the pins 260 is entered in the accumulators.

The tag is then fed out to a concealed inaccessible delivery magazine, permitting another tag to be inserted in holder 221 and the same operations repeated, the checks and card also being fed to the next line $s$.

After each of the tags taken from the dress, overcoat and hat articles have been inserted in holder 221 and fed out, the accumulators 289 which are sub total accumulators will read $89.50 which is the total price of the above mentioned articles. The operator then presses the sub total key 475 which sets both shaft A and B in rotation, the former for the remaining two-thirds of a revolution and the latter for one revolution. During the second third of a revolution of shaft A, it positions both the checks 55 and the card with lines $t$ in printing position. At the same time, the sub total key has caused the sub total accumulators to mesh with the members 278 under control of a cam 532 on shaft B before the latter rise. The members 65 and 65' have in the previous cycle of shaft B been restored to positions determined by those of their associated bars 56 and 56'. Cam 190 on shaft B then raises members 270 which move until the meshed accumulators are at zero. The date, department, clerk's number, kind of sale, and check members are controlled as in the first third of a revolution of shaft A, arms 381 being now latched, so that the printing of the same data as in line $r$ with the addition of the total price may be effected also in line $t$.

The members 124 are then positioned under control of shaft B and the printing of the line $t$ on checks and card is effected.

Shaft A then feeds the card to punching position P$^4$ (Fig. 12) and feeds the check line $v$ to printing position. As shaft A begins its final third movement, it sets shaft B in operation for another revolution. The controls having remained the same, members 124 thus are again positioned for printing in line $v$, the same data as in line $t$. This time, shaft C through cam 573 releases the punch members 121 which position themselves according to the positions of bars 56 and 56' and a punching operation on card T is effected. The card is then fed out and a new card fed into position P' (Fig. 12). At the same time, a new check is fed to printing position and the check control member 170 is advanced.

A cam 626 on shaft C then unlatches the key 10 which is ejected from slot 11 permitting the motor circuit to break and the machine to stop.

While the mechanism shown herein is illustrative of the principles of my invention, it is understood that equivalent means may be devised within the scope of the invention and I therefore wish to be limited only by the following claims.

I claim:

1. A machine having exteriorly accessible means for receiving control members, record-making devices, and means controlled in accordance with the position of one of said members relative to said receiving means for controlling said devices to record a designation corresponding to the position of the control member relative to the receiving means.

2. A machine having exteriorly accessible means for receiving members having control portions, record-making devices, means operating in accordance with the position of one of said members relative to said receiving means for controlling some of said devices to record a designation corresponding to the position of the control member relative to the receiving means, and means operating in accordance with the control portions of said members for controlling others of said devices.

3. A machine having a plurality of exteriorly accessible receiving elements, each adapted to receive the same control members, a record-making device, and means for operating said device differentially in accordance with which element is receiving the control member.

4. A machine for recording a single transaction made up of individual items, comprising a pocket for receiving records bearing data, one record at a time, each record having the data thereon denoting a separate one of said items, recording devices differentially operative for transferring the data of a series of such records to a transaction card, an actuator for actuating the recording devices to effect said record transfer, a delivery magazine for the transaction cards, and ejecting means operated by said actuator for ejecting a transaction card to its magazine subsequent to the transfer of data thereon from each of the records making up the single transaction.

5. A machine for recording a single sales transaction made up of several individual items, comprising a pocket for receiving records bearing data, one record at a time, each such record denoting by its data a different one of said items, recording devices differentially operative for transferring the data of a series of such records to a transaction card, an actuator for actuating said recording devices to effect said record transfer, devices operated by said actuator for designating on said transaction card identifying data common to all of said items of a single transaction, a delivery magazine for the cards, and an ejector operated by said actuator for feeding the transaction card into its magazine after the complete transaction of the several items has been recorded thereon.

6. A machine including means for receiving a member having control portions, recording devices operated in accordance with said portions, means for actuating said devices, a device operated by said member for setting said actuating means in motion, and means controlled by the actuating means for ejecting said control member from the receiving means subsequent to a recording operation.

7. A machine comprising a receiver having a passageway for receiving a record bearing data, a device operated by the record when in said receiver for blocking the passageway to prevent the placing of another record in said receiver, means controlled by the record while in the receiver for transferring the data thereof to an accounting element, and an ejector automatically effective after the transfer of data from the record has been completed for ejecting the record to permit said device to move to inoperative position whereby a succeeding record may move into the passageway.

8. A machine comprising a cyclically operative driving means, a device operated by a record bearing data for automatically setting said driving means in operation for a cycle, means operated by said driving means for transferring the data of said record to an accounting element, and an ejector controlled by the driving means for ejecting said record at the end of a cycle.

9. A machine comprising a registering device, a motor for operating said device, means including a slot for receiving a member having control portions, a switch operated by insertion of said member in said slot for setting said motor in operation to actuate said registering device in accordance with the control portions, and means for automatically ejecting the control member subsequent to the recording operation to open the switch and thereby stop the motor.

10. A machine comprising a holder for holding a manually insertable member in a control position, a pocket for receiving a record bearing data, means operative only while said member is in control position for transferring the data of said record to an accounting element, and an ejector for ejecting the member from the control position subsequent to the transfer of data to said sheet.

11. A machine comprising a holder for holding a member having control portions in a control position, a pocket for receiving a record bearing data, means operated in accordance with said control portions for making a record on a sheet, means operative only while the member is in control position for transferring the data from a record in said pocket to said sheet, and means for thereafter ejecting said member from control position.

12. A machine having type for recording digits and letters in the same column of a record sheet, means for selecting the digits for a recording operation, means for selecting the letters for a recording operation, and means for automatically causing successive operation of both selecting means.

13. A machine comprising type for recording digits in a column of a sheet, type for recording letters in the same column of the sheet, a control member for causing the type for recording digits to operate, a control element for causing the type for recording letters to operate, and means for causing automatic successive operation of both the control element and control member to cause said type to record digits and letters in the same column of said sheet.

14. A machine comprising type for printing different words on a sheet, means for analyzing a record card having designations denoting one of said words, and a single member operated under control of said analyzing means for setting said type to print the word denoted by said designations.

15. A machine comprising means for receiving any one of several operators' keys, an actuator set into motion upon insertion of a key, devices operated by the actuator and controlled by a key when inserted for recording on a sheet the designation of the operator corresponding to the inserted key, a pocket for receiving a data-bearing record inserted by said operator, an auxiliary actuator caused to be operated by the first named actuator upon insertion of said record in the pocket, and devices operated by the auxiliary actuator for transferring the data of said record to said sheet operative only while the key of said operator is in the receiving means.

16. A machine for recording on a general record card a complete transaction which consists of a plurality of separate parts, each part represented on a separate record slip; comprising an insertable control member having distinguishing portions representing classification data, a device for receiving the control member and locating it in control position, a pocket for locating one record slip at a time in a control position, operating means set in motion upon insertion of said control member in said device to condition said pocket to locate a record slip in its control position, transferring devices actuated by said operating means for transferring the data from a slip in control position to the general record card, mechanism controlled by the control member in said device and operated by the operating means for recording the classification data represented by the distinguishing configuration of said control member on the same general record card, ejecting means operated by the operating means for ejecting each separate record slip after its data has been transferred to condition the pocket for receiving another record slip, and other means operated by said operating means for ejecting the control member after the complete transaction has been recorded on the general card to stop operation of the operating means.

17. In a machine for recording a transaction, a main actuator, a first shaft adapted to be coupled to the main actuator, an insertible control member having an identifying configuration and operable upon insertion thereof for coupling said first shaft to the main actuator, devices settable under control of the first shaft to sense the key configuration, a second shaft automatically coupled by the first shaft to the main actuator, recording means controlled by said settable devices, and mechanism operated by the second shaft to cause the recording means under control of said devices to record on a record sheet a symbol identifying the control member.

18. In a machine for recording transactions, a continuously operating actuator, a second actuator adapted to be coupled thereto for operation, an insertible record slip bearing designations, means operated by insertion of a slip for coupling the second actuator to the continuously operating actuator for a cycle of operation, analyzing elements operated by the second actuator during said cycle for analyzing the designations of the record slip, recording devices operated by the second actuator under control of the analyzing elements for recording said designations on a record sheet, and means automatically operative for uncoupling the second actuator from the continuously operating actuator upon completion of the recording operation by said devices.

19. In a machine for recording transactions, a type carrier having two sets of type thereon, an insertible control member, elements controlled by said insertible member for operating said carrier to selectively position type of one set for a recording operation, a second control member, analyzing means coacting with the latter member and rendered effective only after completion of the recording operation controlled by the first control member, means controlled by the analyzing means for operating the carrier to position type of the other set for a recording operation, and a common actuator for the analyzing means and said elements set in operation only by insertion of said first control member.

20. A machine for recording transactions comprising an actuator, a key insertible in the machine for starting operation of the actuator, said key having identifying characteristics, recording devices operated by the actuator under control of said key in accordance with its identifying characteristics for recording on a record medium a designation corresponding to identification of the key, a pocket for insertibly receiving slips having designations representative of a transaction, and a device operated by the actuator after the identification symbol has been recorded for automatically placing the machine in condition to be controlled by a slip in said pocket.

21. A machine for recording a transaction represented on a slip bearing designations representative of the transaction; comprising an actuator, a key insertible in the machine for starting operation of the actuator, said key having identifying characteristics, a recording device, and mechanism operated by the actuator for automatically operating the same recording device under successive control of the slip and the key to successively record the designations of the slip and a designation identifying the key on a common record medium.

22. A machine for recording transactions comprising an actuator, a pocket for receiving slips one at a time representative of different parts of one transaction, recording devices operated by the actuator and controlled by the slips while in the pocket, each slip upon insertion in the pocket setting the actuator in operation for only one complete automatic cycle, and mechanism operated by the actuator at the end of said cycle for ejecting the slip from the pocket after the recording devices have been operated to condition the machine for control by the next slip.

23. In a machine for recording a transaction consisting of several parts, each part represented by a separate slip bearing numerical data designations, and having accumulating means for adding the numerical data on said slip; an insertible key, an actuator settable in operation upon insertion of the key and maintained in operation only while the key is in inserted position, devices controlled by the accumlators and operated by the actuator for recording the total of the numerical data of the several slips on a transaction card, and mechanism automatically controlled by the actuator after the total recording operation to automatically eject the key from said inserted position whereby the actuator stops operating.

24. In a machine for recording a transaction consisting of several parts, each represented by a separate slip bearing numerical data, and having means for effecting recording of the total of said data on a transaction card; an insertible key, devices controlled by the key for identifying the total record by recording a designation on said card representative of the key, and mechanism automatically controlled by the means for effecting the total recording operation to eject said key and permit its complete and ready removal from the machine after the total and the key identifying designation have been recorded.

25. In a machine for recording a sales transaction of an article represented by a sales slip bearing designations denoting the name of the article; a clerk's key having identifying characteristics representative of the clerk, an actuator, recording members operated by the actuator under control of the key for recording the identification of the key on a transaction card, and mechanism operable by the actuator under control of the slip only while the key is in the machine for operating the same recording members to record the name of the article on said card.

26. A machine having a carrier with type for recording digits and letters, a device for controlling the position of said carrier, and separate setting mechanisms operative one at a time for separately setting the device, one mechanism for setting the device differentially to position any of the letter type on the carrier for printing, and the other mechanism for setting the device differentially to position any of the digit type on the carrier for printing.

27. A machine for recording a sales transaction, comprising means for receiving a control member, a main actuator operation of which is initiated upon insertion of said control member in the receiving means, recording devices operated by the main actuator in accordance with said member for making a record on a record sheet, means for supporting a control element in a control position, an auxiliary actuator coupled for operation to the main actuator upon said control element being placed in its control position, and devices actuated by the auxiliary actuator for differential operation in accordance with said control element for making a record on aforesaid record sheet relating to the first-named record.

28. A machine having an actuator, analyzing devices operated by the actuator for analyzing a record bearing data, recording devices operated by the actuator and controlled by the analyzing devices for transferring the data of said record to a second record, means having a plurality of slots exteriorly accessible for receiving control members, means for initiating operation of the actuator upon insertion of one of said control members in any one of said slots, and mechanism operated by the actuator in accordance with which slot contains the inserted control member for designating on said second record a fact for classifying aforesaid transferred data.

29. A machine for recording sales transactions, comprising a casing with a plurality of slots, each representative of a different fact, a control member having characteristics representative of still another fact and insertible into any one of said slots, means under control of the inserted control member for sensing the characteristics of said control member and into which particular slot the control member has been inserted, and recording means controlled by said sensing means for recording the fact representative of the inserted control member and the fact representative of the slot occupied by said control member.

30. A machine for recording a sales transaction, comprising a pocket for receiving a sales slip bearing designations representative of a transaction, a key insertible into the machine and having identifying characteristics, a recording device controlled by the key for recording the identification of the key on a record medium, and an actuator controlled by insertion of the key in the machine for operating the recording device to record the key identification and automatically placing the machine in condition to be controlled by the slip in said pocket.

31. A machine having means for freely insertibly receiving a member having control portions representing data, registering means differentially operative under control of said portions in accordance with the data represented thereby, means for actuating the registering means, a device operated by the member for setting said actuating means in motion, means for holding the device in the position to which it has been operated by the member for thereby maintaining the actuating means in operation, and automatic releasing means connected to the actuating means for automatically releasing said holding means after the registering operation to permit said device to return to ineffective position to thereby interrupt operation of the actuating means.

32. A machine comprising a member manually settable in a control position, a pocket for holding records bearing data, one record at a time, means operative only while said member is in control position for receiving data from such records successively located in the pocket, and ejecting mechanism operative only as long as the member is in control position for ejecting each record from said pocket after the data has been received therefrom.

33. A machine having a plurality of parallel type carriers with digit type to print numbers and letter type to print letters, means for operating the carriers relatively to each other to position the digit type for printing, means for operating the carriers as a rigid unit with the carriers in predetermined relationship to each other to position the letter type for printing, and controls for automatically causing either one of aforesaid operations of the carriers at a time.

34. A machine comprising columns of letter type, an analyzer for searching a record bearing a designation in a plurality of parallel columns representing a single word, and setting mechanism controlled by the analyzer for differentially moving a different number of type columns than the number of designation bearing columns of the record to position the type for printing said word.

35. In a machine controlled by successively, manually inserted records bearing items for successively registering the items; the combination of means for registering the total of the registered items, means for initiating the total registering operation, and devices controlled by operation of said initiating means for interrupting control by said records during the total registering operation.

36. In a machine controlled by records bearing items to register the items as each record is successively placed in a control position; the combination of means for registering the total of the individual items after a series of such records have completed control of the machine, means for initiating the total registering operation, and a device controlled by operation of the initiating means for preventing the placing of a record in control position after the total registering operation is initiated.

37. A machine comprising means for successively recording individual items on a record medium, means for feeding the record medium in one direction to successively position successive spaces thereof to receive the item records, and means for feeding the record medium in the reverse direction to receive a record of the total of said items in an allocated space immediately preceding the first individual item record in the first-named direction.

38. In a machine in which records bearing numerical items successively control the machine to print a list of the items on a tabulating card; the combination of devices for accumulating the items as they are listed, perforating mechanism settable under control of the accumulating devices, means effective only after the last item of the list has been printed to cause the perforating mechanism to be set by control of said accumulating devices according to the total of said list, and feeding mechanism effective upon operation of said means to feed the card to the perforating mechanism to be punched with the total in a space contiguous to the printed list.

JOHN ROYDEN PEIRCE.